(12) United States Patent
Hwang et al.

(10) Patent No.: US 11,789,275 B2
(45) Date of Patent: Oct. 17, 2023

(54) ELECTRONIC DEVICE

(71) Applicant: LG ELECTRONICS INC., Seoul (KR)

(72) Inventors: Changkyu Hwang, Seoul (KR); Seungyong Shin, Seoul (KR); Sungchul Shin, Seoul (KR); Dongyoung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 99 days.

(21) Appl. No.: 16/803,533

(22) Filed: Feb. 27, 2020

(65) Prior Publication Data

US 2021/0199977 A1    Jul. 1, 2021

(30) Foreign Application Priority Data

Dec. 30, 2019    (KR) .................. 10-2019-0178192

(51) Int. Cl.
*G02B 27/01*        (2006.01)

(52) U.S. Cl.
CPC ..... *G02B 27/0176* (2013.01); *G02B 27/0172* (2013.01); *G02B 2027/0132* (2013.01); *G02B 2027/0152* (2013.01); *G02B 2027/0178* (2013.01)

(58) Field of Classification Search
CPC ............ G02B 27/0176; G02B 27/0172; G02B 2027/0132; G02B 2027/0152; G02B 2027/0178; G02B 2027/015; G02B 2027/0123; G02B 5/08; G02B 3/0037; G02B 21/18; G02B 21/20; G02B 23/00; G02B 23/18; G02B 25/00; G02B 25/002; G02B 25/004

USPC ......................................................... 359/480
See application file for complete search history.

(56) References Cited

U.S. PATENT DOCUMENTS

| 5,079,416 A * | 1/1992 | Filipovich ................ G02B 6/06 313/523 |
| 2010/0164840 A1 | 7/2010 | Yamamoto |
| 2015/0168730 A1* | 6/2015 | Ashkenazi ......... G02B 27/0172 359/631 |
| 2016/0225192 A1* | 8/2016 | Jones ...................... G06F 3/011 |

(Continued)

FOREIGN PATENT DOCUMENTS

| CN | 101627622 A | 1/2010 |
| CN | 107533224 A | 1/2018 |

(Continued)

*Primary Examiner* — James C. Jones
*Assistant Examiner* — Henry Duong
(74) *Attorney, Agent, or Firm* — Birch, Stewart, Kolasch & Birch, LLP

(57) ABSTRACT

Provided is a glass type electronic device in which an optical driving assembly is disposed in a spatially efficient position and which stably implements an optical path. The glass type electronic device includes a binocular lens provided to correspond to both eyes of a wearer, a lens frame fixed to the binocular lens and seated on a head of the wearer, an electronic component case fixed to the lens frame, an optical driving assembly mounted in the electronic component case for emitting an image light to the binocular lens, and a battery supplying power to the optical driving assembly. The electronic component case is disposed to correspond to an area between superciliary arches of the wearer.

13 Claims, 26 Drawing Sheets

(56) References Cited

U.S. PATENT DOCUMENTS

| | | | |
|---|---|---|---|
| 2018/0031841 A1 | 2/2018 | Hsieh et al. | |
| 2019/0121132 A1 | 4/2019 | Shamir et al. | |
| 2020/0348524 A1* | 11/2020 | Chen | G02C 11/10 |
| 2020/0355927 A1 | 11/2020 | Marcellin-Dibon et al. | |
| 2021/0057070 A1* | 2/2021 | Ferguson, III | G06T 11/60 |
| 2021/0181517 A1* | 6/2021 | DeMaio | H01M 50/247 |
| 2021/0333549 A1 | 10/2021 | Jo et al. | |

FOREIGN PATENT DOCUMENTS

| | | |
|---|---|---|
| CN | 107664839 A | 2/2018 |
| CN | 109073901 A | 12/2018 |
| EP | 2 106 132 A1 | 9/2009 |
| JP | 2006-126590 A | 5/2006 |
| KR | 10-2019-0110494 A | 9/2019 |
| WO | WO 2016/135727 A1 | 9/2016 |
| WO | WO 2018/115762 A1 | 6/2018 |
| WO | WO 2018/182159 A1 | 10/2018 |

* cited by examiner

ELECTRONIC DEVICE

CROSS-REFERENCE TO RELATED APPLICATION

This application claims the priority benefit of Korean Patent Application No. 10-2019-0178192, filed on Dec. 30, 2019, in the Korean Intellectual Property Office, the disclosure of which is incorporated by reference herein in its entirety.

BACKGROUND

1. Field

The present disclosure relates to a glass-type electronic device for providing augmented reality information.

2. Description of the Related Art

With the development of devices and communication performance, a multi-device system in which several devices are interconnected and organically operated is rapidly emerging. In particular, it is possible to link with external information, for example, by providing information in accordance with recognition of a user's location or an image of an object. In addition, a data processing speed and a display resolution have improved. Accordingly, there have been developed many electronic devices each having a front frame capable of outputting information, such as an image, so that a user can experience virtual reality or augmented reality when wearing such an electronic device. A device that provides information while fully covering a user's actual field of view can be referred to as an augmented reality (AR) device. A device that provides additional information for an actual object present in the user's actual field of view can be referred to as an augmented reality (AR) device. These devices can be generally referred to as eXtended reality (XR) devices.

In particular, unlike the virtual reality device which can only be used in a limited space, the augmented reality device is emphasized with mobility as a portable device. That is, for the augmented reality device, light weight, small volume, comfortable fit, etc. are important factors. To meet this need, there are efforts to minimize the number of components of the augmented reality device and implement a battery capacity as small as possible, so that an augmented reality device with a small volume and a light weight can be provided.

In consideration of the requirements of such an electronic device, it can be necessary to specify the structure and arrangement of an optical driving assembly that emits light, corresponding to an image, to a lens corresponding to both eyes of a wearer.

In particular, for the glass-type electronic device to be worn on the head of the wearer, it is important to have a light weight and transverse balance and not to obstruct the wearer's field of view. Of course, it is also necessary to provide an image without distortion.

However, an existing glass type electronic device has failed to meet these requirements.

SUMMARY

The present disclosure is provided to achieve a light weight and transverse balance which an existing glass type electronic device has failed to achieve.

The present disclosure is also provided to address obstruction to a user's field of view by the existing glass type electronic device.

The present disclosure is also provided to address distortion of a content image by the existing glass type electronic device.

According to one aspect of the present disclosure, there is provided an electronic device including a binocular lens provided to correspond to eyes of a wearer, a lens frame fixed to the binocular lens and configured to be seated on a head of the wearer, an electronic component case fixed to the lens frame; an optical driving assembly mounted in the electronic component case and configured to emit image light to the binocular lens, and a battery configured to supply power to the optical driving assembly. A position of the electronic component case can correspond to an area between superciliary arches of the wearer.

Further, according to another aspect of the present disclosure, the lens frame can include an upper frame coupled to an upper boundary of the binocular lens, and the electronic component case can be fixed to the upper frame.

Further, according to another aspect of the present disclosure, the electronic component case can be provided at a rear side of the upper frame.

Further, according to another aspect of the present disclosure, the electronic device can further include a support member provided at a rear side of the electronic component case to support an area between the superciliary arches of the wearer.

Further, according to another aspect of the present disclosure, the support member can be provided at the rear side of the electronic component case and include an elastic material.

Further, according to another aspect of the present disclosure, the rear side of the upper frame can include a concave portion that is recessed forward and the electronic component case can include a forward protrusion that fills the concave portion of the upper frame.

Further, according to another aspect of the present disclosure, an upper transverse width of an upper portion of the electronic component case is greater than a lower transverse width of a lower portion of the electronic component case.

Further, according to another aspect of the present disclosure, the upper portion of the electronic component case can correspond to the area between the superciliary arches of the wearer and the lower portion of the electronic component case corresponds to an area of a nasal root of the wearer.

Further, according to another aspect of the present disclosure, the battery can be provided in the upper portion of the electronic component case overlapping at least a portion of the optical driving assembly.

Further, according to another aspect of the present disclosure, the optical driving assembly can include an image source panel configured to emit light and an emitting lens group provided on an optical path of the light emitted from the image source panel. The image source panel and the emitting lens group can be provided in the lower portion of the electronic component case.

Further, according to another aspect of the present disclosure, the lens frame further can include a side frame configured to be seated at both sides of the head of the wearer, the upper frame can include an inner portion forming a center area of the lens frame and an outer portion provided transversely outward of the inner portion and connected to the side frame, and the inner portion can be fixed to an upper boundary of the binocular lens, and the outer portion is spaced from the upper boundary of the binocular lens and is fixed to the side frame.

Further, according to another aspect of the present disclosure, the battery can be spaced apart forward from the area between the superciliary arches of the wearer.

Further, according to another aspect of the present disclosure, there is provided an electronic device including a binocular lens provided to correspond to eyes of a wearer, a lens frame connected to the binocular lens and configured to be seated on a head of the wearer, an electronic component case disposed in a central area of the binocular lens and connected to the lens frame, and an optical driving assembly mounted in the electronic component case and configured to emit an image light to the binocular lens. The optical driving assembly can include an image source panel configured to emit light and an emitting lens group provided on an optical path of the light emitted from the image source panel.

Further, according to another aspect of the present disclosure, there is further included a reflective mirror configured to reflect light emitted from the emitting lens group so that the reflected light is reflected to a reflection region of the binocular lens.

Further, according to another aspect of the present disclosure, the reflective mirror can be provided between the reflection region and the emitting lens group, as viewed from the front side of the electronic device.

Further, according to another aspect of the present disclosure, with respect to a vertical plane passing through a center of an exit surface of the emitting lens group and a center of a reflection region, a direction vector of the light emitted from the emitting lens group can have a rearward component.

Further, according to another aspect of the present disclosure, the binocular lens comprises an optically transparent material, and the reflection region is coated so that at least a portion of light is reflected.

BRIEF DESCRIPTION OF THE DRAWINGS

The above and other aspects, features, and advantages of certain embodiments will be more apparent from the following detailed description taken in conjunction with the accompanying drawings, in which:

FIGS. 7A, 7B, 8A, 8B, 8C, 8D, 8E, 8F, 9A, 9B, 9C, 9D, 10A, 10B, 100, 10D, 11A, 11B, 11C, 12 and 13 illustrate various display methods applicable to a display unit according to one embodiment of the present invention;

DETAILED DESCRIPTION

Figure 1:
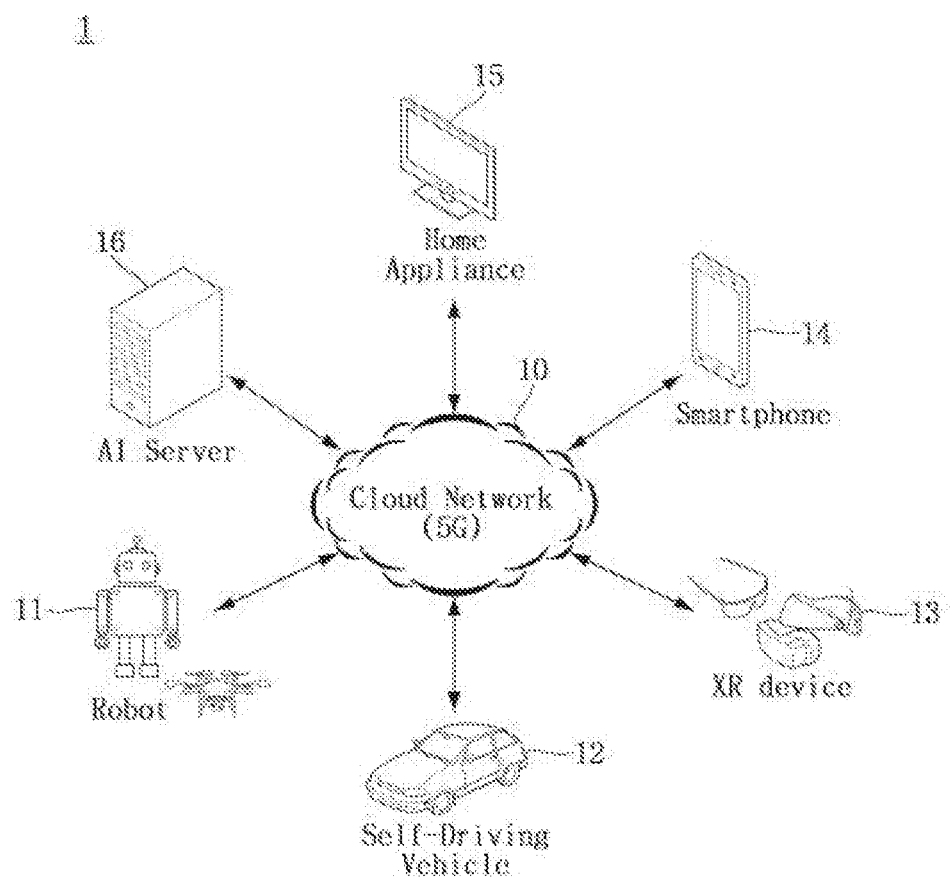
FIG. 1 illustrates one embodiment of an AI device.

In what follows, embodiments disclosed in this document will be described in detail with reference to appended drawings, where the same or similar constituent elements are given the same reference number irrespective of their drawing symbols, and repeated descriptions thereof will be omitted.

In describing an embodiment disclosed in the present specification, if a constituting element is said to be "connected" or "attached" to other constituting element, it should be understood that the former can be connected or attached directly to the other constituting element, but there can be a case in which another constituting element is present between the two constituting elements.

Also, in describing an embodiment disclosed in the present document, if it is determined that a detailed description of a related art incorporated herein unnecessarily obscure the gist of the embodiment, the detailed description thereof will be omitted. Also, it should be understood that the appended drawings are intended only to help understand embodiments disclosed in the present document and do not limit the technical principles and scope of the present invention; rather, it should be understood that the appended drawings include all of the modifications, equivalents or substitutes described by the technical principles and belonging to the technical scope of the present invention.

The three main requirement areas in the 5G system are (1) enhanced Mobile Broadband (eMBB) area, (2) massive Machine Type Communication (mMTC) area, and (3) Ultra-Reliable and Low Latency Communication (URLLC) area.

Some use case can require a plurality of areas for optimization, but other use case can focus only one Key Performance Indicator (KPI). The 5G system supports various use cases in a flexible and reliable manner.

eMBB far surpasses the basic mobile Internet access, supports various interactive works, and covers media and entertainment applications in the cloud computing or augmented reality environment. Data is one of core driving elements of the 5G system, which is so abundant that for the first time, the voice-only service can be disappeared. In the 5G, voice is expected to be handled simply by an application program using a data connection provided by the communication system. Primary causes of increased volume of traffic are increase of content size and increase of the number of applications requiring a high data transfer rate. Streaming service (audio and video), interactive video, and mobile Internet connection will be more heavily used as more and more devices are connected to the Internet. These application programs require always-on connectivity to push real-time information and notifications to the user. Cloud-based storage and applications are growing rapidly in the mobile communication platforms, which can be applied to both of business and entertainment uses. And the cloud-based storage is a special use case that drives growth of uplink data transfer rate. The 5G is also used for cloud-based remote works and requires a much shorter end-to-end latency to ensure excellent user experience when a tactile interface is used. Entertainment, for example, cloud-based game and video streaming, is another core element that strengthens the requirement for mobile broadband capability. Entertainment is essential for smartphones and tablets in any place including a high mobility environment such as a train, car, and plane. Another use case is augmented reality for entertainment and information search. Here, augmented reality requires very low latency and instantaneous data transfer.

Also, one of highly expected 5G use cases is the function that connects embedded sensors seamlessly in every possible area, namely the use case based on mMTC. Up to 2020, the number of potential IoT devices is expected to reach 20.4 billion. Industrial IoT is one of key areas where the 5G performs a primary role to maintain infrastructure for smart city, asset tracking, smart utility, agriculture and security.

URLLC includes new services which can transform industry through ultra-reliable/ultra-low latency links, such as remote control of major infrastructure and self-driving cars. The level of reliability and latency are essential for smart grid control, industry automation, robotics, and drone control and coordination.

Next, a plurality of use cases will be described in more detail.

The 5G can complement Fiber-To-The-Home (FTTH) and cable-based broadband (or DOCSIS) as a means to provide a stream estimated to occupy hundreds of megabits per second up to gigabits per second. This fast speed is required not only for virtual reality and augmented reality but also for transferring video with a resolution more than 4K (6K, 8K or more). VR and AR applications almost always include immersive sports games. Specific application programs can require a special network configuration. For example, in the case of VR game, to minimize latency, game service providers can have to integrate a core server with the edge network service of the network operator.

Automobiles are expected to be a new important driving force for the 5G system together with various use cases of mobile communication for vehicles. For example, entertainment for passengers requires high capacity and high mobile broadband at the same time. This is so because users continue to expect a high-quality connection irrespective of their location and moving speed. Another use case in the automotive field is an augmented reality dashboard. The augmented reality dashboard overlays information, which is a perception result of an object in the dark and contains distance to the object and object motion, on what is seen through the front window. In a future, a wireless module enables communication among vehicles, information exchange between a vehicle and supporting infrastructure, and information exchange among a vehicle and other connected devices (for example, devices carried by a pedestrian). A safety system guides alternative courses of driving so that a driver can drive his or her vehicle more safely and to reduce the risk of accident. The next step will be a remotely driven or self-driven vehicle. This step requires highly reliable and highly fast communication between different self-driving vehicles and between a self-driving vehicle and infrastructure. In the future, it is expected that a self-driving vehicle takes care of all of the driving activities while a human driver focuses on dealing with an abnormal driving situation that the self-driving vehicle is unable to recognize. Technical requirements of a self-driving vehicle demand ultra-low latency and ultra-fast reliability up to the level that traffic safety may not be reached by human drivers.

The smart city and smart home, which are regarded as essential to realize a smart society, will be embedded into a high-density wireless sensor network. Distributed networks comprising intelligent sensors can identify conditions for cost-efficient and energy-efficient conditions for maintaining cities and homes. A similar configuration can be applied for each home. Temperature sensors, window and heating controllers, anti-theft alarm devices, and home appliances will be all connected wirelessly. Many of these sensors typified with a low data transfer rate, low power, and low cost. However, for example, real-time HD video can require specific types of devices for the purpose of surveillance.

As consumption and distribution of energy including heat or gas is being highly distributed, automated control of a distributed sensor network is required. A smart grid collects information and interconnect sensors by using digital information and communication technologies so that the distributed sensor network operates according to the collected information. Since the information can include behaviors of energy suppliers and consumers, the smart grid can help improving distribution of fuels such as electricity in terms of efficiency, reliability, economics, production sustainability, and automation. The smart grid can be regarded as a different type of sensor network with a low latency.

The health-care sector has many application programs that can benefit from mobile communication. A communication system can support telemedicine providing a clinical care from a distance. Telemedicine can help reduce barriers to distance and improve access to medical services that are not readily available in remote rural areas. It can also be used to save lives in critical medical and emergency situations. A wireless sensor network based on mobile communication can provide remote monitoring and sensors for parameters such as the heart rate and blood pressure.

Wireless and mobile communication are becoming increasingly important for industrial applications. Cable wiring requires high installation and maintenance costs. Therefore, replacement of cables with reconfigurable wireless links is an attractive opportunity for many industrial applications. However, to exploit the opportunity, the wireless connection is required to function with a latency similar to that in the cable connection, to be reliable and of large capacity, and to be managed in a simple manner. Low latency and very low error probability are new requirements that lead to the introduction of the 5G system.

Logistics and freight tracking are important use cases of mobile communication, which require tracking of an inventory and packages from any place by using location-based information system. The use of logistics and freight tracking typically requires a low data rate but requires large-scale and reliable location information.

The present invention to be described below can be implemented by combining or modifying the respective embodiments to satisfy the aforementioned requirements of the 5G system.

FIG. 1 illustrates one embodiment of an AI device.

Referring to FIG. 1, in the AI system, at least one or more of an AI server 16, robot 11, self-driving vehicle 12, XR device 13, smartphone 14, or home appliance 15 are connected to a cloud network 10. Here, the robot 11, self-driving vehicle 12, XR device 13, smartphone 14, or home appliance 15 to which the AI technology has been applied can be referred to as an AI device (11 to 15).

The cloud network 10 can comprise part of the cloud computing infrastructure or refer to a network existing in the cloud computing infrastructure. Here, the cloud network 10 can be constructed by using the 3G network, 4G or Long Term Evolution (LTE) network, or 5G network.

In other words, individual devices (11 to 16) constituting the AI system can be connected to each other through the cloud network 10. In particular, each individual device (11 to 16) can communicate with each other through an eNB evolved Node 8) but can communicate directly to each other without relying on the eNB.

The AI server 16 can include a server performing AI processing and a server performing computations on big data.

The AI server 16 can be connected to at least one or more of the robot 11, self-driving vehicle 12, XR device 13, smartphone 14, or home appliance 15, which are AI devices constituting the AI system, through the cloud network 10 and can help at least part of AI processing conducted in the connected AI devices (11 to 15).

At this time, the AI server 16 can teach the artificial neural network according to a machine learning algorithm on behalf of the AI device (11 to 15), directly store the learning model, or transmit the learning model to the AI device (11 to 15).

At this time, the AI server 16 can receive input data from the AI device (11 to 15), infer a result value from the received input data by using the learning model, generate a response or control command based on the inferred result value, and transmit the generated response or control command to the AI device (11 to 15).

Similarly, the AI device (11 to 15) can infer a result value from the input data by employing the learning model directly and generate a response or control command based on the inferred result value.

By employing the AI technology, the robot 11 can be implemented as a guide robot, transport robot, cleaning robot, wearable robot, entertainment robot, pet robot, or unmanned flying robot.

The robot 11 can include a robot control module for controlling its motion, where the robot control module can correspond to a software module or a chip which implements the software module in the form of a hardware device.

The robot 11 can obtain status information of the robot 11, detect (recognize) the surroundings and objects, generate map data, determine a travel path and navigation plan, determine a response to user interaction, or determine motion by using sensor information obtained from various types of sensors.

Here, the robot 11 can use sensor information obtained from at least one or more sensors among lidar, radar, and camera to determine a travel path and navigation plan.

The robot 11 can perform the operations above by using a learning model built on at least one or more artificial neural networks. For example, the robot 11 can recognize the surroundings and objects by using the learning model and determine its motion by using the recognized surroundings or object information. Here, the learning model can be the one trained by the robot 11 itself or trained by an external device such as the AI server 16.

At this time, the robot 11 can perform the operation by generating a result by employing the learning model directly but also perform the operation by transmitting sensor information to an external device such as the AI server 16 and receiving a result generated accordingly.

The robot 11 can determine a travel path and navigation plan by using at least one or more of object information detected from the map data and sensor information or object information obtained from an external device and navigate according to the determined travel path and navigation plan by controlling its locomotion platform.

Map data can include object identification information about various objects disposed in the space in which the robot 11 navigates. For example, the map data can include object identification information about static objects such as wall and doors and movable objects such as a flowerpot and a desk. And the object identification information can include the name, type, distance, location, and so on.

Also, the robot 11 can perform the operation or navigate the space by controlling its locomotion platform based on the control/interaction of the user. At this time, the robot 11 can obtain intention information of the interaction due to the user's motion or voice command and perform an operation by determining a response based on the obtained intention information.

By employing the AI technology, the self-driving vehicle 12 can be implemented as a mobile robot, unmanned ground vehicle, or unmanned aerial vehicle.

The self-driving vehicle 12 can include an autonomous navigation module for controlling its autonomous navigation function, where the autonomous navigation control module can correspond to a software module or a chip which implements the software module in the form of a hardware device. The autonomous navigation control module can be installed inside the self-driving vehicle 12 as a constituting element thereof or can be installed outside the self-driving vehicle 12 as a separate hardware component.

The self-driving vehicle 12 can obtain status information of the self-driving vehicle 12, detect (recognize) the surroundings and objects, generate map data, determine a travel path and navigation plan, or determine motion by using sensor information obtained from various types of sensors.

Like the robot 11, the self-driving vehicle 12 can use sensor information obtained from at least one or more sensors among lidar, radar, and camera (but not limited thereto) to determine a travel path and navigation plan.

In particular, the self-driving vehicle 12 can recognize an occluded area or an area extending over a predetermined distance or objects located across the area by collecting sensor information from external devices or receive recognized information directly from the external devices.

The self-driving vehicle 12 can perform the operations above by using a learning model built on at least one or more artificial neural networks. For example, the self-driving vehicle 12 can recognize the surroundings and objects by using the learning model and determine its navigation route by using the recognized surroundings or object information. Here, the learning model can be the one trained by the self-driving vehicle 12 itself or trained by an external device such as the AI server 16.

At this time, the self-driving vehicle 12 can perform the operation by generating a result by employing the learning model directly but also perform the operation by transmitting sensor information to an external device such as the AI server 16 and receiving a result generated accordingly.

The self-driving vehicle 12 can determine a travel path and navigation plan by using at least one or more of object information detected from the map data and sensor information or object information obtained from an external device and navigate according to the determined travel path and navigation plan by controlling its driving platform.

Map data can include object identification information about various objects disposed in the space (for example, road) in which the self-driving vehicle 12 navigates. For example, the map data can include object identification information about static objects such as streetlights, rocks and buildings and movable objects such as vehicles and pedestrians. And the object identification information can include the name, type, distance, location, and so on.

Also, the self-driving vehicle 12 can perform the operation or navigate the space by controlling its driving platform based on the control/interaction of the user. At this time, the self-driving vehicle 12 can obtain intention information of the interaction due to the user's motion or voice command and perform an operation by determining a response based on the obtained intention information.

By employing the AI technology, the XR device 13 can be implemented as a Head-Mounted Display (HMD), Head-Up Display (HUD) installed at the vehicle, TV, mobile phone, smartphone, computer, wearable device, home appliance, digital signage, vehicle, robot with a fixed platform, or mobile robot.

The XR device 13 can obtain information about the surroundings or physical objects by generating position and attribute data about 3D points by analyzing 3D point cloud or image data acquired from various sensors or external devices and output objects in the form of XR objects by rendering the objects for display.

The XR device 13 can perform the operations above by using a learning model built on at least one or more artificial neural networks. For example, the XR device 13 can recognize physical objects from 3D point cloud or image data by using the learning model and provide information corresponding to the recognized physical objects. Here, the learning model can be the one trained by the XR device 13 itself or trained by an external device such as the AI server 16.

At this time, the XR device 13 can perform the operation by generating a result by employing the learning model directly but also perform the operation by transmitting sensor information to an external device such as the AI server 16 and receiving a result generated accordingly.

By employing the AI and autonomous navigation technologies, the robot 11 can be implemented as a guide robot, transport robot, cleaning robot, wearable robot, entertainment robot, pet robot, or unmanned flying robot.

The robot 11 employing the AI and autonomous navigation technologies can correspond to a robot itself having an autonomous navigation function or a robot 11 interacting with the self-driving vehicle 12.

The robot 11 having the autonomous navigation function can correspond collectively to the devices which can move autonomously along a given path without control of the user or which can move by determining its path autonomously.

The robot 11 and the self-driving vehicle 12 having the autonomous navigation function can use a common sensing method to determine one or more of the travel path or navigation plan. For example, the robot 11 and the self-driving vehicle 12 having the autonomous navigation function can determine one or more of the travel path or navigation plan by using the information sensed through lidar, radar, and camera.

The robot 11 interacting with the self-driving vehicle 12, which exists separately from the self-driving vehicle 12, can be associated with the autonomous navigation function inside or outside the self-driving vehicle 12 or perform an operation associated with the user riding the self-driving vehicle 12.

At this time, the robot 11 interacting with the self-driving vehicle 12 can obtain sensor information in place of the self-driving vehicle 12 and provide the sensed information to the self-driving vehicle 12; or can control or assist the autonomous navigation function of the self-driving vehicle 12 by obtaining sensor information, generating information of the surroundings or object information, and providing the generated information to the self-driving vehicle 12.

Also, the robot 11 interacting with the self-driving vehicle 12 can control the function of the self-driving vehicle 12 by monitoring the user riding the self-driving vehicle 12 or through interaction with the user. For example, if it is determined that the driver is drowsy, the robot 11 can activate the autonomous navigation function of the self-driving vehicle 12 or assist the control of the driving platform of the self-driving vehicle 12. Here, the function of the self-driving vehicle 12 controlled by the robot 12 can include not only the autonomous navigation function but also the navigation system installed inside the self-driving vehicle 12 or the function provided by the audio system of the self-driving vehicle 12.

Also, the robot 11 interacting with the self-driving vehicle 12 can provide information to the self-driving vehicle 12 or assist functions of the self-driving vehicle 12 from the outside of the self-driving vehicle 12. For example, the robot 11 can provide traffic information including traffic sign information to the self-driving vehicle 12 like a smart traffic light or can automatically connect an electric charger to the charging port by interacting with the self-driving vehicle 12 like an automatic electric charger of the electric vehicle.

By employing the AI technology, the robot 11 can be implemented as a guide robot, transport robot, cleaning robot, wearable robot, entertainment robot, pet robot, or unmanned flying robot.

The robot 11 employing the XR technology can correspond to a robot which acts as a control/interaction target in the XR image. In this case, the robot 11 can be distinguished from the XR device 13, both of which can operate in conjunction with each other.

If the robot 11, which acts as a control/interaction target in the XR image, obtains sensor information from the sensors including a camera, the robot 11 or XR device 13 can generate an XR image based on the sensor information, and the XR device 13 can output the generated XR image. And the robot 11 can operate based on the control signal received through the XR device 13 or based on the interaction with the user.

For example, the user can check the XR image corresponding to the viewpoint of the robot 11 associated remotely through an external device such as the XR device 13, modify the navigation path of the robot 11 through interaction, control the operation or navigation of the robot 11, or check the information of nearby objects.

By employing the AI and XR technologies, the self-driving vehicle 12 can be implemented as a mobile robot, unmanned ground vehicle, or unmanned aerial vehicle.

The self-driving vehicle 12 employing the XR technology can correspond to a self-driving vehicle having a means for providing XR images or a self-driving vehicle which acts as a control/interaction target in the XR image. In particular, the self-driving vehicle 12 which acts as a control/interaction target in the XR image can be distinguished from the XR device 13, both of which can operate in conjunction with each other.

The self-driving vehicle 12 having a means for providing XR images can obtain sensor information from sensors including a camera and output XR images generated based on the sensor information obtained. For example, by displaying an XR image through HUD, the self-driving vehicle 12 can provide XR images corresponding to physical objects or image objects to the passenger.

At this time, if an XR object is output on the HUD, at least part of the XR object can be output so as to be overlapped with the physical object at which the passenger gazes. On the other hand, if an XR object is output on a display installed inside the self-driving vehicle 12, at least part of the XR object can be output so as to be overlapped with an image object. For example, the self-driving vehicle 12 can output XR objects corresponding to the objects such as roads, other vehicles, traffic lights, traffic signs, bicycles, pedestrians, and buildings.

If the self-driving vehicle 12, which acts as a control/interaction target in the XR image, obtains sensor information from the sensors including a camera, the self-driving vehicle 12 or XR device 13 can generate an XR image based on the sensor information, and the XR device 13 can output the generated XR image. And the self-driving vehicle 12 can operate based on the control signal received through an external device such as the XR device 13 or based on the interaction with the user.

eXtended Reality (XR) refers to all of Virtual Reality (VR), Augmented Reality (AR), and Mixed Reality (MR). The VR technology provides objects or backgrounds of the real world only in the form of CG images, AR technology provides virtual CG images overlaid on the physical object images, and MR technology employs computer graphics technology to mix and merge virtual objects with the real world.

MR technology is similar to AR technology in a sense that physical objects are displayed together with virtual objects. However, while virtual objects supplement physical objects in the AR, virtual and physical objects co-exist as equivalents in the MR.

The XR technology can be applied to Head-Mounted Display (HMD), Head-Up Display (HUD), mobile phone, tablet PC, laptop computer, desktop computer, TV, digital signage, and so on, where a device employing the XR technology can be called an XR device.

In what follows, an electronic device providing XR according to an embodiment of the present invention will be described.

Figure 2:
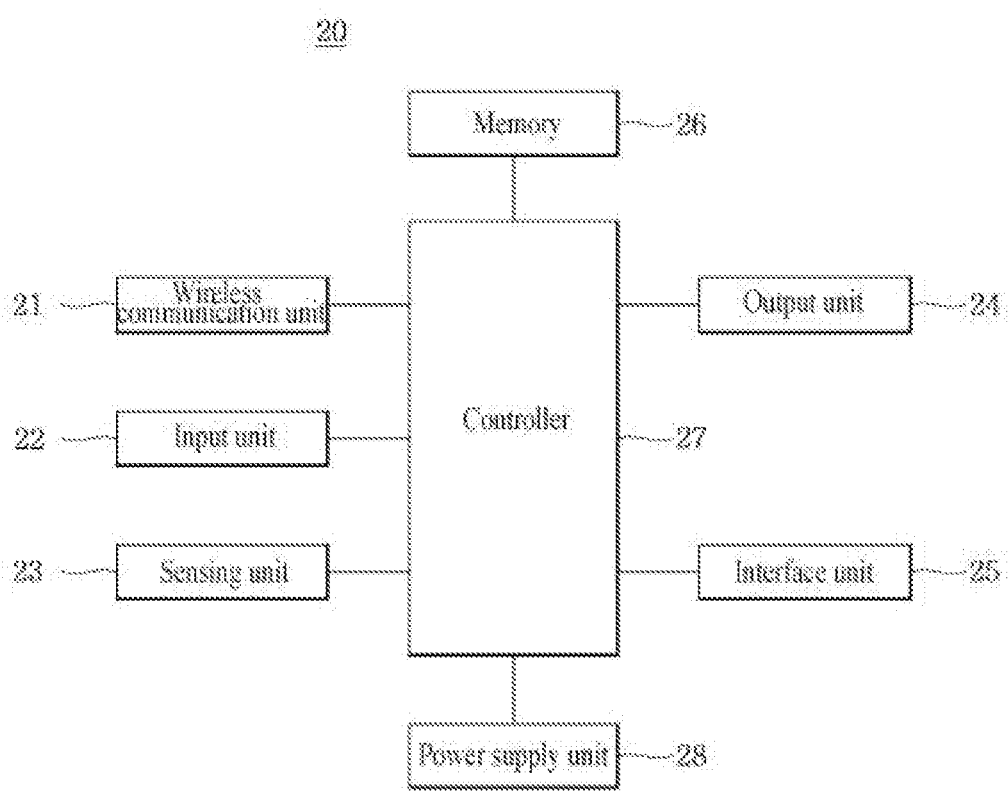
FIG. 2 is a block diagram illustrating the structure of an eXtended Reality (XR) electronic device according to one embodiment of the present disclosure.

FIG. 2 is a block diagram illustrating the structure of an XR electronic device 20 according to one embodiment of the present invention.

Referring to FIG. 2, the XR electronic device 20 can include a wireless communication unit 21, input unit 22, sensing unit 23, output unit 24, interface unit 25, memory 26, controller 27, and power supply unit 28. The constituting elements shown in FIG. 2 are not essential for implementing the electronic device 20, and therefore, the electronic device 20 described in this document can have more or fewer constituting elements than those listed above.

More specifically, among the constituting elements above, the wireless communication unit 21 can include one or more modules which enable wireless communication between the electronic device 20 and a wireless communication system, between the electronic device 20 and other electronic device, or between the electronic device 20 and an external server. Also, the wireless communication unit 21 can include one or more modules that connect the electronic device 20 to one or more networks.

The wireless communication unit 21 can include at least one of a broadcast receiving module, mobile communication module, wireless Internet module, short-range communication module, and location information module.

The input unit 22 can include a camera or image input unit for receiving an image signal, microphone or audio input unit for receiving an audio signal, and user input unit (for example, touch key) for receiving information from the user, and push key (for example, mechanical key). Voice data or image data collected by the input unit 22 can be analyzed and processed as a control command of the user.

The sensing unit 23 can include one or more sensors for sensing at least one of the surroundings of the electronic device 20 and user information.

For example, the sensing unit 23 can include at least one of a proximity sensor, illumination sensor, touch sensor, acceleration sensor, magnetic sensor, G-sensor, gyroscope sensor, motion sensor, RGB sensor, infrared (IR) sensor, finger scan sensor, ultrasonic sensor, optical sensor (for example, image capture means), microphone, battery gauge, environment sensor (for example, barometer, hygrometer, radiation detection sensor, heat detection sensor, and gas detection sensor), and chemical sensor (for example, electronic nose, health-care sensor, and biometric sensor). Meanwhile, the electronic device 20 disclosed in the present specification can utilize information collected from at least two or more sensors listed above.

The output unit 24 is intended to generate an output related to a visual, aural, or tactile stimulus and can include at least one of a display unit, sound output unit, haptic module, and optical output unit. The display unit can implement a touchscreen by forming a layered structure or being integrated with touch sensors. The touchscreen may not only function as a user input means for providing an input interface between the AR electronic device 20 and the user but also provide an output interface between the AR electronic device 20 and the user.

The interface unit 25 serves as a path to various types of external devices connected to the electronic device 20. Through the interface unit 25, the electronic device 20 can receive VR or AR content from an external device and perform interaction by exchanging various input signals, sensing signals, and data.

For example, the interface unit 25 can include at least one of a wired/wireless headset port, external charging port, wired/wireless data port, memory card port, port for connecting to a device equipped with an identification module, audio Input/Output (I/O) port, video I/O port, and earphone port.

Also, the memory 26 stores data supporting various functions of the electronic device 20. The memory 26 can store a plurality of application programs (or applications) executed in the electronic device 20; and data and commands for operation of the electronic device 20. Also, at least part of the application programs can be pre-installed at the electronic device 20 from the time of factory shipment for basic functions (for example, incoming and outgoing call function and message reception and transmission function) of the electronic device 20.

The controller 27 usually controls the overall operation of the electronic device 20 in addition to the operation related to the application program. The controller 27 can process signals, data, and information input or output through the constituting elements described above.

Also, the controller 27 can provide relevant information or process a function for the user by executing an application program stored in the memory 26 and controlling at least part of the constituting elements. Furthermore, the controller 27 can combine and operate at least two or more constituting elements among those constituting elements included in the electronic device 20 to operate the application program.

Also, the controller 27 can detect the motion of the electronic device 20 or user by using a gyroscope sensor, g-sensor, or motion sensor included in the sensing unit 23. Also, the controller 27 can detect an object approaching the vicinity of the electronic device 20 or user by using a proximity sensor, illumination sensor, magnetic sensor, infrared sensor, ultrasonic sensor, or light sensor included in the sensing unit 23. Besides, the controller 27 can detect the motion of the user through sensors installed at the controller operating in conjunction with the electronic device 20.

Also, the controller 27 can perform the operation (or function) of the electronic device 20 by using an application program stored in the memory 26.

The power supply unit 28 receives external or internal power under the control of the controller 27 and supplies the power to each and every constituting element included in the electronic device 20. The power supply unit 28 includes battery, which can be provided in a built-in or replaceable form.

At least part of the constituting elements described above can operate in conjunction with each other to implement the operation, control, or control method of the electronic device according to various embodiments described below. Also, the operation, control, or control method of the electronic device can be implemented on the electronic device by executing at least one application program stored in the memory 26.

In what follows, the electronic device according to one embodiment of the present invention will be described with reference to an example where the electronic device is applied to a Head Mounted Display (HMD). However, embodiments of the electronic device according to the present invention can include a mobile phone, smartphone, laptop computer, digital broadcast terminal, Personal Digital Assistant (PDA), Portable Multimedia Player (PMP), navigation terminal, slate PC, tablet PC, ultrabook, and wearable device. Wearable devices can include smart watch and contact lens in addition to the HMD.

Figure 3:
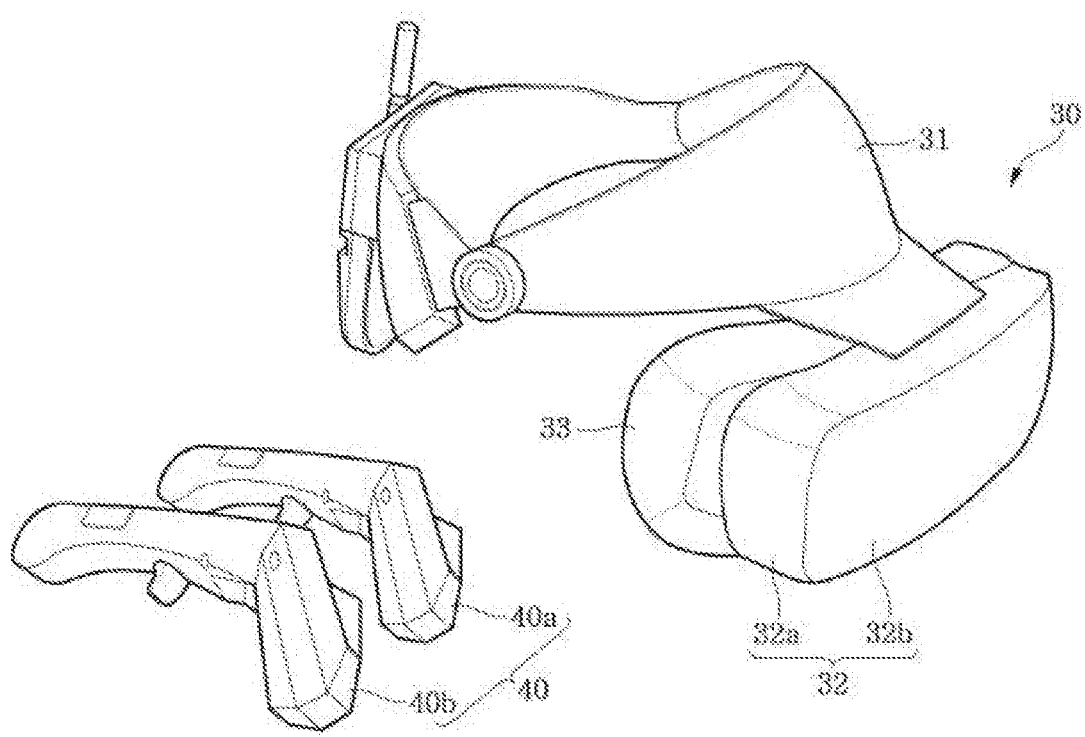
FIG. 3 is a perspective view of a VR electronic device according to one embodiment of the present disclosure.
Figure 4:
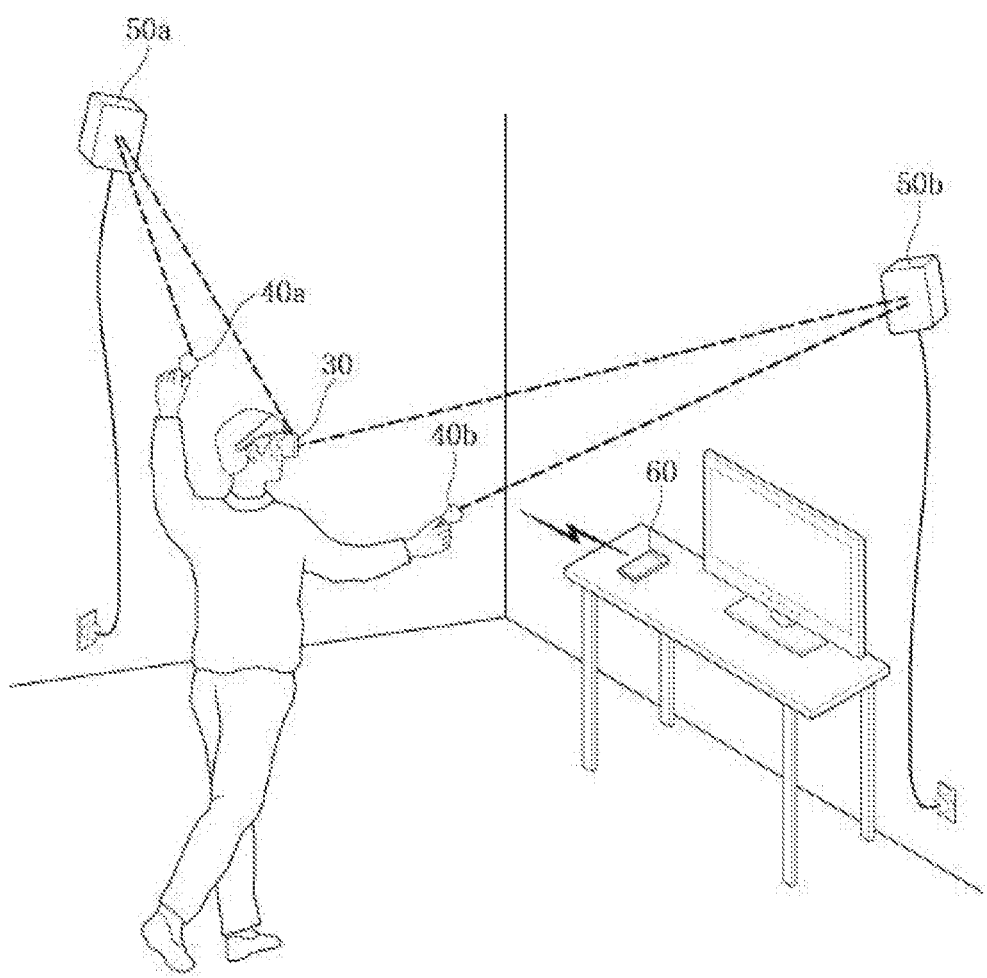
FIG. 4 illustrates a situation in which the VR electronic device of FIG. 3 is used.

FIG. 3 is a perspective view of a VR electronic device according to one embodiment of the present invention, and FIG. 4 illustrates a situation in which the VR electronic device of FIG. 3 is used.

Referring to the figures, a VR electronic device can include a box-type electronic device 30 mounted on the head of the user and a controller 40 (40*a*, 40*b*) that the user can grip and manipulate.

The electronic device 30 includes a head unit 31 worn and supported on the head and a display unit 32 being combined with the head unit 31 and displaying a virtual image or video in front of the user's eyes. Although the figure shows that the head unit 31 and display unit 32 are made as separate units and combined together, the display unit 32 can also be formed being integrated into the head unit 31.

The head unit 31 can assume a structure of enclosing the head of the user so as to disperse the weight of the display unit 32. And to accommodate different head sizes of users, the head unit 31 can provide a band of variable length.

The display unit 32 includes a cover unit 32*a* combined with the head unit 31 and a display unit 32*b* containing a display panel.

The cover unit 32*a* is also called a goggle frame and can have the shape of a tub as a whole. The cover unit 32*a* has a space formed therein, and an opening is formed at the front surface of the cover unit, the position of which corresponds to the eyeballs of the user.

The display unit 32*b* is installed on the front surface frame of the cover unit 32*a* and disposed at the position corresponding to the eyes of the user to display screen information (image or video). The screen information output on the display unit 32*b* includes not only VR content but also external images collected through an image capture means such as a camera.

And VR content displayed on the display unit 32*b* can be the content stored in the electronic device 30 itself or the content stored in an external device 60. For example, when the screen information is an image of the virtual world stored in the electronic device 30, the electronic device 30 can perform image processing and rendering to process the image of the virtual world and display image information generated from the image processing and rendering through the display unit 32*b*. On the other hand, in the case of a VR image stored in the external device 60, the external device 60 performs image processing and rendering and transmits image information generated from the image processing and rendering to the electronic device 30. Then the electronic device 30 can output 3D image information received from the external device 60 through the display unit 32*b*.

The display unit 32*b* can include a display panel installed at the front of the opening of the cover unit 32*a*, where the display panel can be an LCD or OLED panel. Similarly, the display unit 32*b* can be a display unit of a smartphone. In other words, the display unit 32*b* can have a specific structure in which a smartphone can be attached to or detached from the front of the cover unit 32*a*.

And an image capture means and various types of sensors can be installed at the front of the display unit 32.

The image capture means (for example, camera) is formed to capture (receive or input) the image of the front and can obtain a real world as seen by the user as an image. One image capture means can be installed at the center of the display unit 32*b*, or two or more of them can be installed at symmetric positions. When a plurality of image capture means are installed, a stereoscopic image can be obtained. An image combining an external image obtained from an image capture means with a virtual image can be displayed through the display unit 32*b*.

Various types of sensors can include a gyroscope sensor, motion sensor, or IR sensor. Various types of sensors will be described in more detail later.

At the rear of the display unit 32, a facial pad 33 can be installed. The facial pad 33 is made of cushioned material and is fit around the eyes of the user, providing comfortable fit to the face of the user. And the facial pad 33 is made of a flexible material with a shape corresponding to the front contour of the human face and can be fit to the facial shape of a different user, thereby blocking external light from entering the eyes.

In addition to the above, the electronic device 30 can be equipped with a user input unit operated to receive a control command, sound output unit, and controller. Descriptions of the aforementioned units are the same as give previously and will be omitted.

Also, a VR electronic device can be equipped with a controller 40 (40*a*, 40*b*) for controlling the operation related to VR images displayed through the box-type electronic device 30 as a peripheral device.

The controller 40 is provided in a way that the user can easily grip the controller 40 by using his or her both hands, and the outer surface of the controller 40 can have a touchpad (or trackpad) or buttons for receiving the user input.

The controller 40 can be used to control the screen output on the display unit 32b in conjunction with the electronic device 30. The controller 40 can include a grip unit that the user grips and a head unit extended from the grip unit and equipped with various sensors and a microprocessor. The grip unit can be shaped as a long vertical bar so that the user can easily grip the grip unit, and the head unit can be formed in a ring shape.

And the controller 40 can include an IR sensor, motion tracking sensor, microprocessor, and input unit. For example, IR sensor receives light emitted from a position tracking device 50 to be described later and tracks motion of the user. The motion tracking sensor can be formed as a single sensor suite integrating a 3-axis acceleration sensor, 3-axis gyroscope, and digital motion processor.

And the grip unit of the controller 40 can provide a user input unit. For example, the user input unit can include keys disposed inside the grip unit, touchpad (trackpad) equipped outside the grip unit, and trigger button.

Meanwhile, the controller 40 can perform a feedback operation corresponding to a signal received from the controller 27 of the electronic device 30. For example, the controller 40 can deliver a feedback signal to the user in the form of vibration, sound, or light.

Also, by operating the controller 40, the user can access an external environment image seen through the camera installed in the electronic device 30. In other words, even in the middle of experiencing the virtual world, the user can immediately check the surrounding environment by operating the controller 40 without taking off the electronic device 30.

Also, the VR electronic device can further include a position tracking device 50. The position tracking device 50 detects the position of the electronic device 30 or controller 40 by applying a position tracking technique, called lighthouse system, and helps tracking the 360-degree motion of the user.

The position tacking system can be implemented by installing one or more position tracking device 50 (50a, 50b) in a closed, specific space. A plurality of position tracking devices 50 can be installed at such positions that maximize the span of location-aware space, for example, at positions facing each other in the diagonal direction.

The electronic device 30 or controller 40 can receive light emitted from LED or laser emitter included in the plurality of position tracking devices 50 and determine the accurate position of the user in a closed, specific space based on a correlation between the time and position at which the corresponding light is received. To this purpose, each of the position tracking devices 50 can include an IR lamp and 2-axis motor, through which a signal is exchanged with the electronic device 30 or controller 40.

Also, the electronic device 30 can perform wired/wireless communication with an external device 60 (for example, PC, smartphone, or tablet PC). The electronic device 30 can receive images of the virtual world stored in the connected external device 60 and display the received image to the user.

Meanwhile, since the controller 40 and position tracking device 50 described above are not essential elements, they can be omitted in the embodiments of the present invention. For example, an input device installed in the electronic device 30 can replace the controller 40, and position information can be determined by itself from various sensors installed in the electronic device 30.

Figure 5:
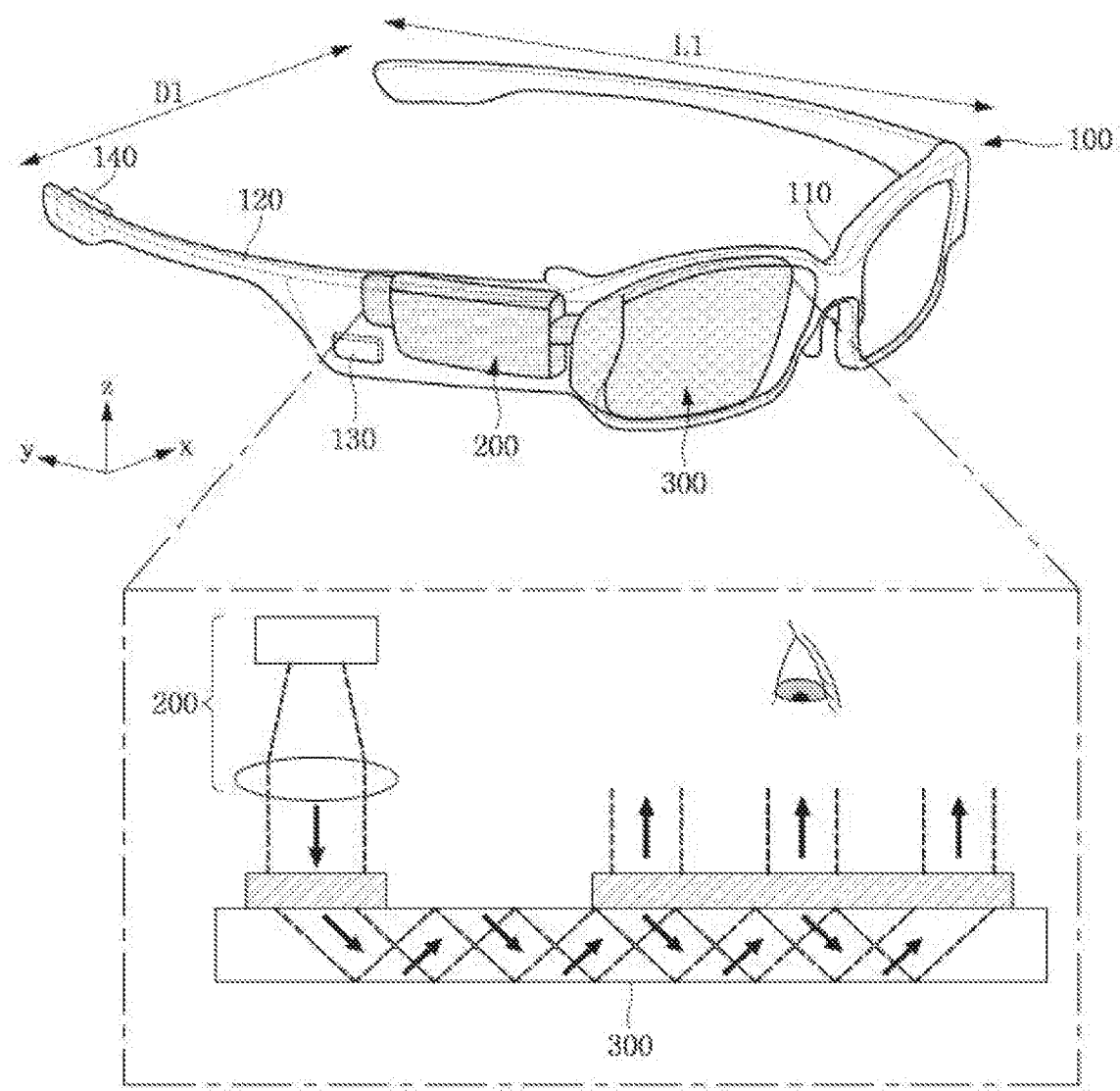
FIG. 5 is a perspective view of an AR electronic device according to one embodiment of the present disclosure.

FIG. 5 is a perspective view of an AR electronic device according to one embodiment of the present invention.

As shown in FIG. 5, the electronic device according to one embodiment of the present invention can include a frame 100, optical driving unit 200, and display unit 300.

The electronic device can be provided in the form of smart glasses. The glass-type electronic device can be shaped to be worn on the head of the user, for which the frame (case or housing) 100 can be used. The frame 100 can be made of a flexible material so that the user can wear the glass-type electronic device comfortably.

The frame 100 is supported on the head and provides a space in which various components are installed. As shown in the figure (FIG. 5), electronic components such as the optical driving unit 200, user input unit 130, or sound output unit 140 can be installed in the frame 100. Also, lens that covers at least one of the left and right eyes can be installed in the frame 100 in a detachable manner.

As shown in the figure, the frame 100 can have a shape of glasses worn on the face of the user; however, the present invention is not limited to the specific shape and can have a shape such as goggles worn in close contact with the user's face.

The frame 100 can include a front frame 110 having at least one opening and one pair of side frames 120 parallel to each other and being extended in a first direction (y), which are intersected by the front frame 110.

The optical driving unit 200 is configured to control various electronic components installed in the electronic device.

The optical driving unit 200 can generate an image shown to the user or video comprising successive images. The optical driving unit 200 can include an image source panel that generates an image and a plurality of lenses that diffuse and converge light generated from the image source panel.

The optical driving unit 200 can be fixed to either of the two side frames 120. For example, the optical driving unit 200 can be fixed in the inner or outer surface of one side frame 120 or embedded inside one of side frames 120. Or the optical driving unit 200 can be fixed to the front frame 110 or provided separately from the electronic device.

The display unit 300 can be implemented in the form of a Head Mounted Display (HMD). HMD refers to a particular type of display device worn on the head and showing an image directly in front of eyes of the user. The display unit 300 can be disposed to correspond to at least one of left and right eyes so that images can be shown directly in front of the eye(s) of the user when the user wears the electronic device. The present figure illustrates a case where the display unit 300 is disposed at the position corresponding to the right eye of the user so that images can be shown before the right eye of the user.

The display unit 300 can be used so that an image generated by the optical driving unit 200 is shown to the user while the user visually recognizes the external environment. For example, the display unit 300 can project an image on the display area by using a prism.

And the display unit 300 can be formed to be transparent so that a projected image and a normal view (the visible part of the world as seen through the eyes of the user) in the front are shown at the same time. For example, the display unit 300 can be translucent and made of optical elements including glass.

And the display unit 300 can be fixed by being inserted into the opening included in the front frame 110 or can be fixed on the front surface 110 by being positioned on the rear surface of the opening (namely between the opening and the user's eye). Although the figure illustrates one example where the display unit 300 is fixed on the front surface 110 by being positioned on the rear surface of the rear surface, the display unit 300 can be disposed and fixed at various positions of the frame 100.

As shown in FIG. 5, the electronic device can operate so that if the optical driving unit 200 projects light about an image onto one side of the display unit 300, the light is emitted to the other side of the display unit, and the image generated by the optical driving unit 200 is shown to the user.

Accordingly, the user can see the image generated by the optical driving unit 200 while seeing the external environment simultaneously through the opening of the frame 100. In other words, the image output through the display unit 300 can be seen by being overlapped with a normal view. By using the display characteristic described above, the electronic device can provide an AR experience which shows a virtual image overlapped with a real image or background as a single, interwoven image.

Figure 6:
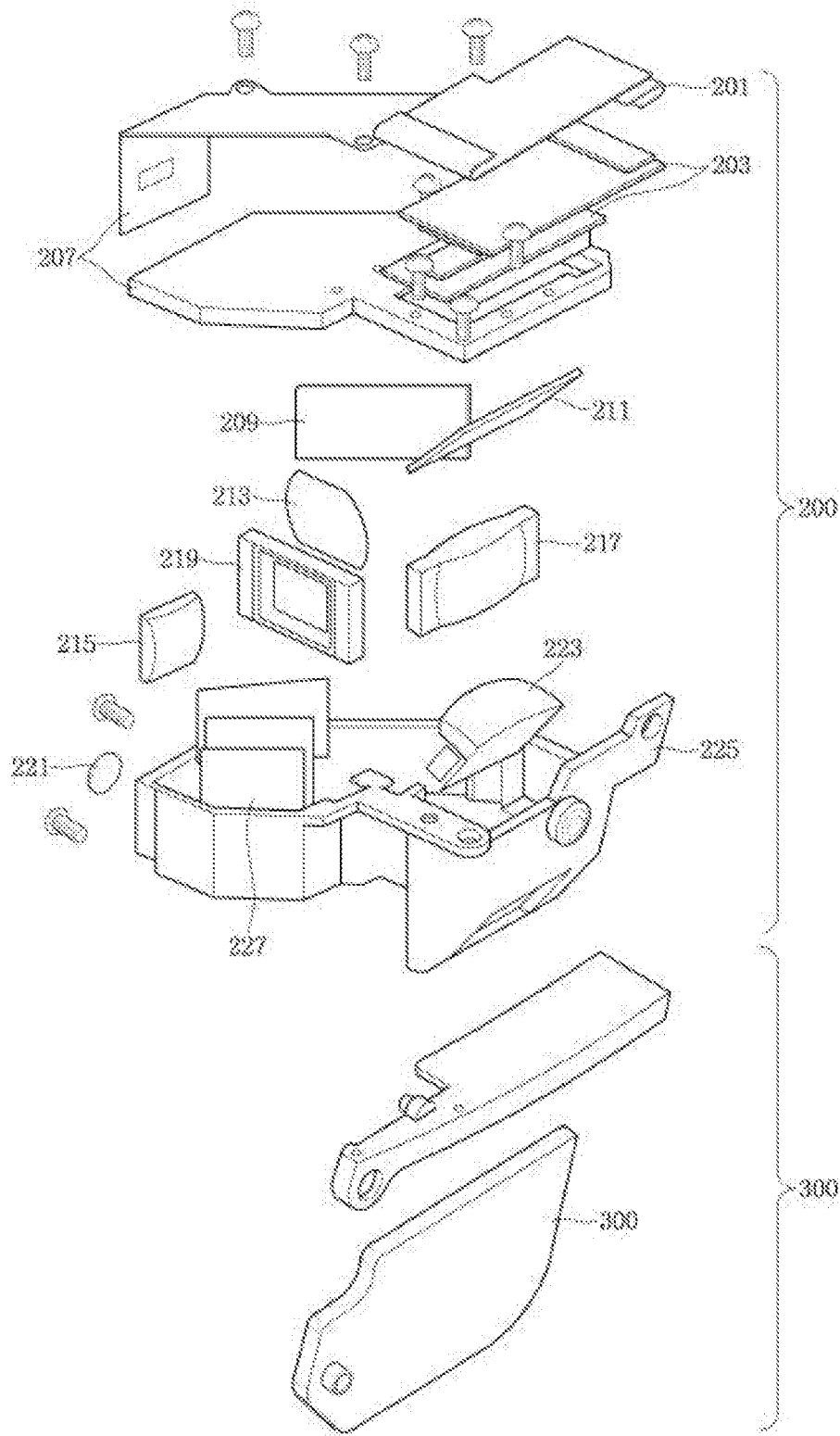
FIG. 6 is an exploded perspective view of an optical driving assembly according to one embodiment of the present disclosure.

FIG. 6 is an exploded perspective view of an optical driving unit according to one embodiment of the present invention.

Referring to the figure, the optical driving unit 200 can include a first cover 207 and second cover 225 for protecting internal constituting elements and forming the external appearance of the optical driving unit 200, where, inside the first 207 and second 225 covers, included are a driving unit 201, image source panel 203, Polarization Beam Splitter Filter (PBSF) 211, mirror 209, a plurality of lenses 213, 215, 217, 221, Fly Eye Lens (FEL) 219, Dichroic filter 227, and Freeform prism Projection Lens (FPL) 223.

The first 207 and second 225 covers provide a space in which the driving unit 201, image source panel 203, PBSF 211, mirror 209, a plurality of lenses 213, 215, 217, 221, FEL 219, Dichroic filter 227, and FPL 223 can be installed, and the internal constituting elements are packaged and fixed to either of the side frames 120.

The driving unit 201 can supply a driving signal that controls a video or an image displayed on the image source panel 203 and can be linked to a separate modular driving chip installed inside or outside the optical driving unit 200. The driving unit 201 can be installed in the form of Flexible Printed Circuits Board (FPCB), which can be equipped with heatsink that dissipates heat generated during operation to the outside.

The image source panel 203 can generate an image according to a driving signal provided by the driving unit 201 and emit light according to the generated image. To this purpose, the image source panel 203 can use the Liquid Crystal Display (LCD) or Organic Light Emitting Diode (OLED) panel.

The PBSF 211 can separate light due to the image generated from the image source panel 203 or block or pass part of the light according to a rotation angle. Therefore, for example, if the image light emitted from the image source panel 203 is composed of P wave, which is horizontal light, and S wave, which is vertical light, the PBSF 211 can separate the P and S waves into different light paths or pass the image light of one polarization or block the image light of the other polarization. The PBSF 211 can be provided as a cube type or plate type in one embodiment.

The cube-type PBSF 211 can filter the image light composed of P and S waves and separate them into different light paths while the plate-type PBSF 211 can pass the image light of one of the P and S waves but block the image light of the other polarization.

The mirror 209 reflects the image light separated from polarization by the PBSF 211 to collect the polarized image light again and let the collected image light incident on a plurality of lenses 213, 215, 217, 221.

The plurality of lenses 213, 215, 217, 221 can include convex and concave lenses and for example, can include I-type lenses and C-type lenses. The plurality of lenses 213, 215, 217, 221 repeat diffusion and convergence of image light incident on the lenses, thereby improving straightness of the image light rays.

The FEL 219 can receive the image light which has passed the plurality of lenses 213, 215, 217, 221 and emit the image light so as to improve illuminance uniformity and extend the area exhibiting uniform illuminance due to the image light.

The dichroic filter 227 can include a plurality of films or lenses and pass light of a specific range of wavelengths from the image light incoming from the FEL 219 but reflect light not belonging to the specific range of wavelengths, thereby adjusting saturation of color of the image light. The image light which has passed the dichroic filter 227 can pass through the FPL 223 and be emitted to the display unit 300.

The display unit 300 can receive the image light emitted from the optical driving unit 200 and emit the incident image light to the direction in which the user's eyes are located.

Meanwhile, in addition to the constituting elements described above, the electronic device can include one or more image capture means. The image capture means, being disposed close to at least one of left and right eyes, can capture the image of the front area. Or the image capture means can be disposed so as to capture the image of the side/rear area.

Since the image capture means is disposed close to the eye, the image capture means can obtain the image of a real world seen by the user. The image capture means can be installed at the frame 100 or arranged in plural numbers to obtain stereoscopic images.

The electronic device can provide a user input unit 130 manipulated to receive control commands. The user input unit 130 can adopt various methods including a tactile manner in which the user operates the user input unit by sensing a tactile stimulus from a touch or push motion, gesture manner in which the user input unit recognizes the hand motion of the user without a direct touch thereon, or a manner in which the user input unit recognizes a voice command. The present figure illustrates a case where the user input unit 130 is installed at the frame 100.

Also, the electronic device can be equipped with a microphone which receives a sound and converts the received sound to electrical voice data and a sound output unit 140 that outputs a sound. The sound output unit 140 can be configured to transfer a sound through an ordinary sound output scheme or bone conduction scheme. When the sound output unit 140 is configured to operate according to the bone conduction scheme, the sound output unit 140 is fit to the head when the user wears the electronic device and transmits sound by vibrating the skull.

In what follows, various forms of the display unit 300 and various methods for emitting incident image light rays will be described.

FIGS. 7A, 7B, 8A, 8B, 8C, 8D, 8E, 8F, 9A, 9B, 9C, 9D, 10A, 108, 100, 10D, 11A, 11B, 11C, 12 and 13 illustrate various display methods applicable to the display unit 300 according to one embodiment of the present invention.

Figure 7A:
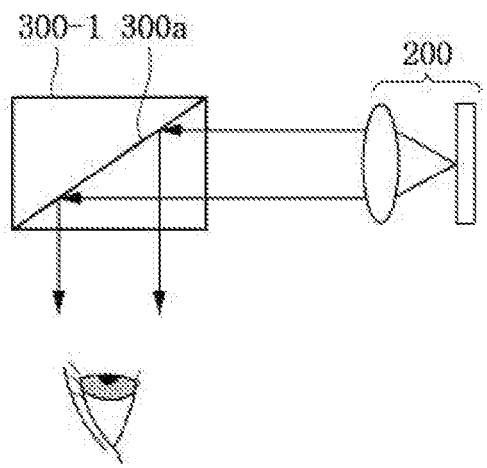
Figure 7B:
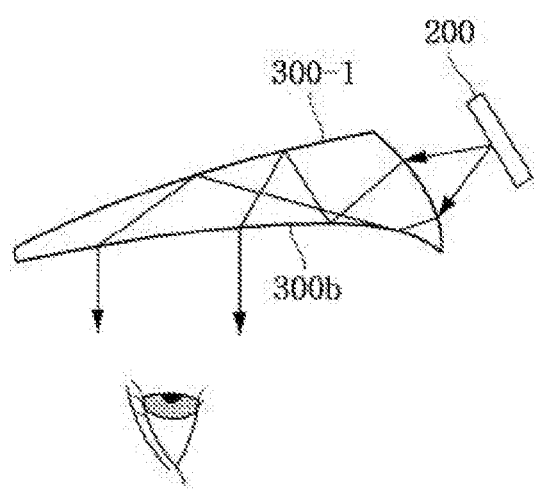
Figure 11A:
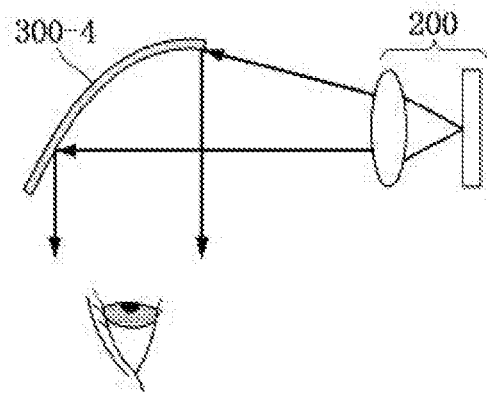
Figure 11B:
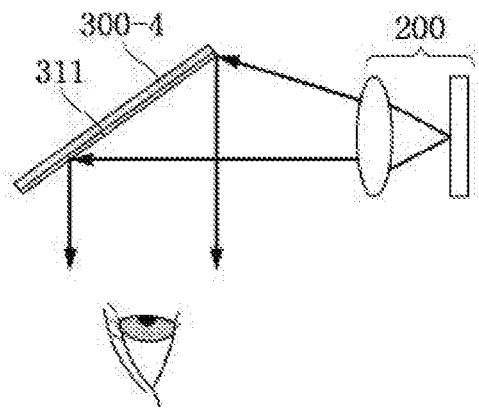
Figure 11C:
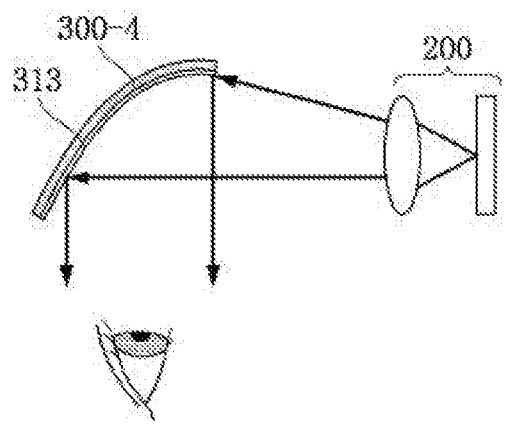
Figure 12:
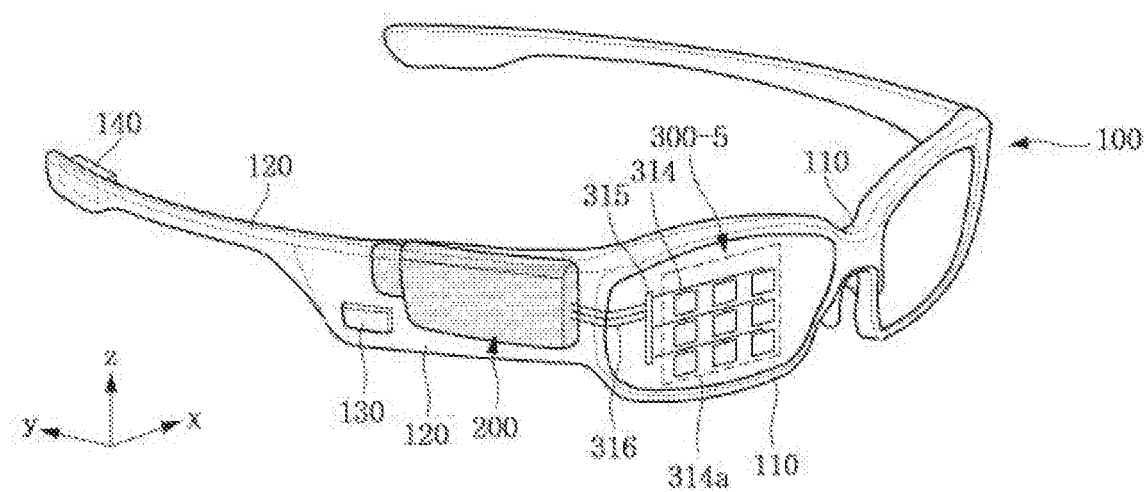
Figure 13:
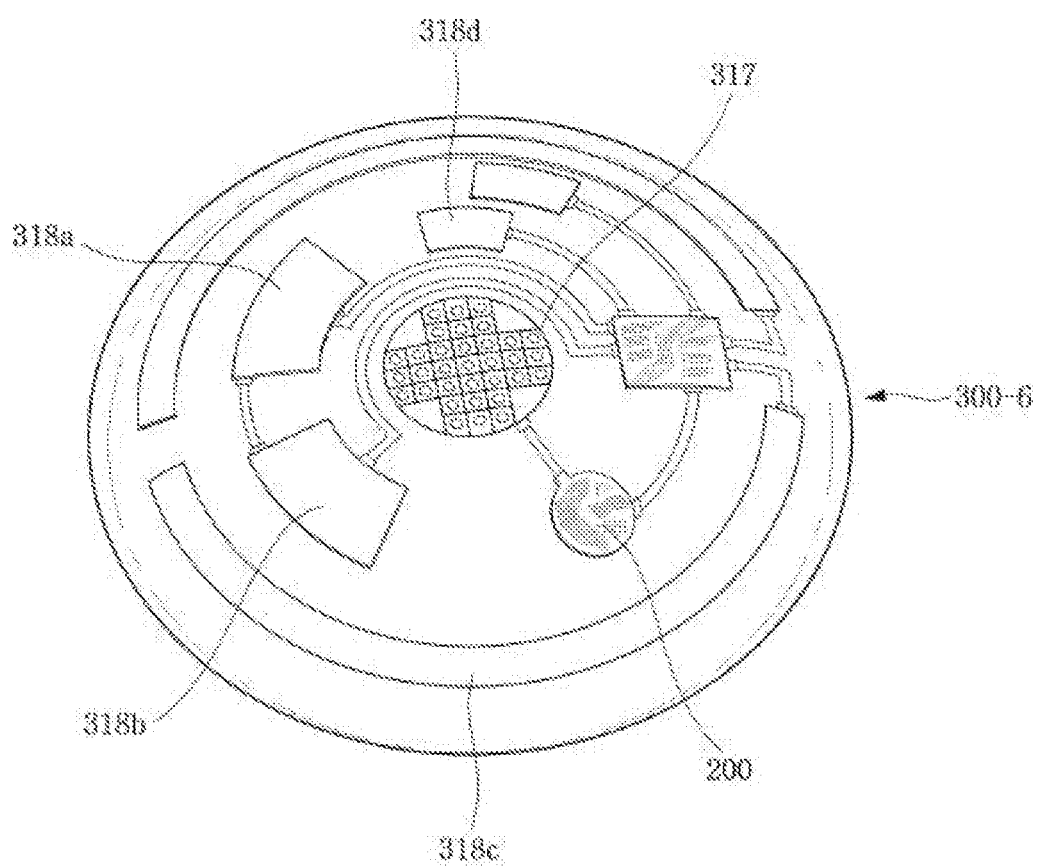

More specifically, FIGS. 7A and 7B illustrate one embodiment of a prism-type optical element; FIGS. 8A, 8B, 8C, 8D, 8E and 8F illustrate one embodiment of a waveguide-type optical element; FIGS. 9A, 9B, 9C, 9D, 10A, 10B, 10C and 10D illustrate one embodiment of a pin mirror-type optical element; and FIGS. 11A, 11B and 11C illustrate one embodiment of a surface reflection-type optical element. FIG. 12 illustrates one embodiment of a micro-LED type optical element, and FIG. 13 illustrates one embodiment of a display unit used for contact lenses.

As shown in FIGS. 7A and 7B, the display unit 300-1 according to one embodiment of the present invention can use a prism-type optical element.

In one embodiment, as shown in FIG. 7A, a prism-type optical element can use a flat-type glass optical element where the surface 300a on which image light rays are incident and from which the image light rays are emitted is planar or as shown in FIG. 7B, can use a freeform glass optical element where the surface 300b from which the image light rays are emitted is formed by a curved surface without a fixed radius of curvature.

The flat-type glass optical element can receive the image light generated by the optical driving unit 200 through the flat side surface, reflect the received image light by using the total reflection mirror 300a installed inside and emit the reflected image light toward the user. Here, laser is used to form the total reflection mirror 300a installed inside the flat type glass optical element.

The freeform glass optical element is formed so that its thickness becomes thinner as it moves away from the surface on which light is incident, receives image light generated by the optical driving unit 200 through a side surface having a finite radius of curvature, totally reflects the received image light, and emits the reflected light toward the user.

As shown in FIGS. 8A, 8B, 8C, 8D, 8E and 8F, the display unit 300-2 according to another embodiment of the present invention can use a waveguide-type optical element or light guide optical element (LOE).

Figure 8A:
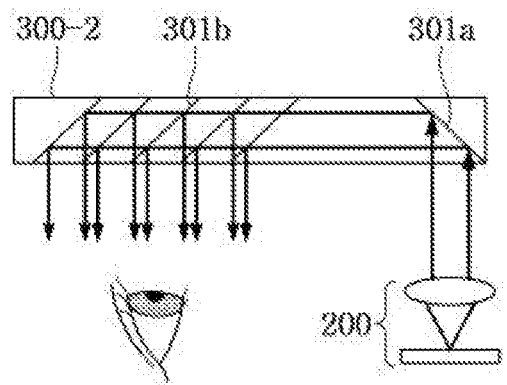
Figure 8B:
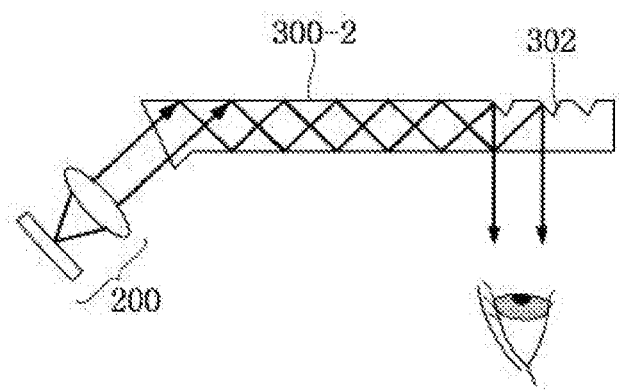
Figure 8C:
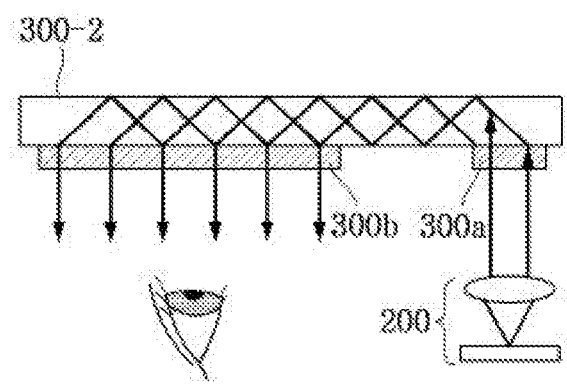
Figure 8D:
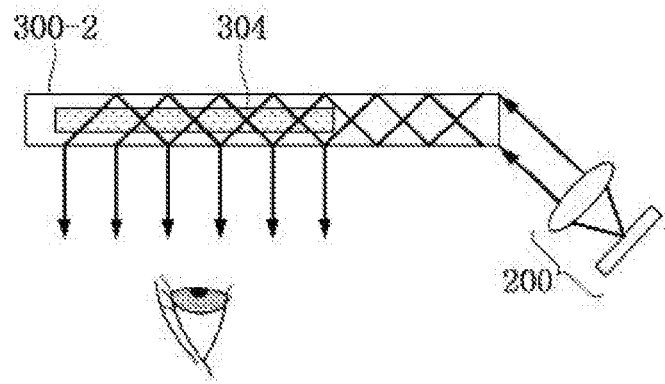
Figure 8E:
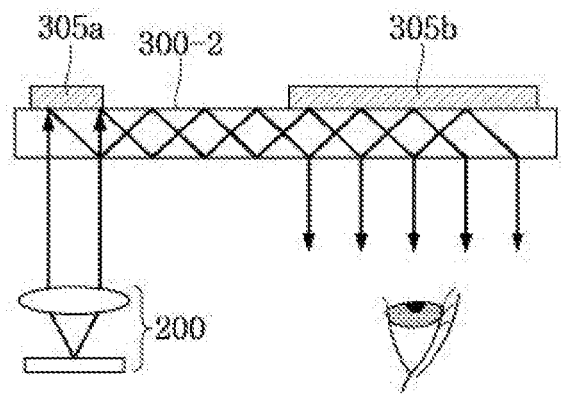
Figure 8F:
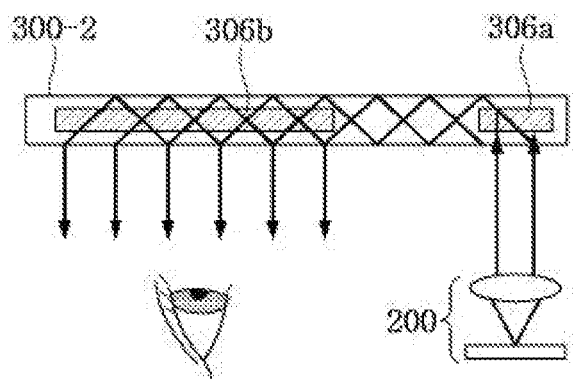

As one embodiment, the waveguide or light guide-type optical element can be implemented by using a segmented beam splitter-type glass optical element as shown in FIG. 8A, saw tooth prism-type glass optical element as shown in FIG. 8B, glass optical element having a diffractive optical element (DOE) as shown in FIG. 8C, glass optical element having a hologram optical element (HOE) as shown in FIG. 8D, glass optical element having a passive grating as shown in FIG. 8E, and glass optical element having an active grating as shown in FIG. 8F.

As shown in FIG. 8A, the segmented beam splitter-type glass optical element can have a total reflection mirror 301a where an optical image is incident and a segmented beam splitter 301b where an optical image is emitted.

Accordingly, the optical image generated by the optical driving unit 200 is totally reflected by the total reflection mirror 301a inside the glass optical element, and the totally reflected optical image is partially separated and emitted by the partial reflection mirror 301b and eventually perceived by the user while being guided along the longitudinal direction of the glass.

In the case of the saw tooth prism-type glass optical element as shown in FIG. 8B, the optical image generated by the optical driving unit 200 is incident on the side surface of the glass in the oblique direction and totally reflected into the inside of the glass, emitted to the outside of the glass by the saw tooth-shaped uneven structure 302 formed where the optical image is emitted, and eventually perceived by the user.

The glass optical element having a Diffractive Optical Element (DOE) as shown in FIG. 8C can have a first diffraction unit 300a on the surface of the part on which the optical image is incident and a second diffraction unit 300b on the surface of the part from which the optical image is emitted. The first and second diffraction units 300a, 300b can be provided in a way that a specific pattern is patterned on the surface of the glass or a separate diffraction film is attached thereon.

Accordingly, the optical image generated by the optical driving unit 200 is diffracted as it is incident through the first diffraction unit 300a, guided along the longitudinal direction of the glass while being totally reflected, emitted through the second diffraction unit 300b, and eventually perceived by the user.

The glass optical element having a Hologram Optical Element (HOE) as shown in FIG. 8D can have an out-coupler 304 inside the glass from which an optical image is emitted. Accordingly, the optical image is incoming from the optical driving unit 200 in the oblique direction through the side surface of the glass, guided along the longitudinal direction of the glass by being totally reflected, emitted by the out-coupler 304, and eventually perceived by the user. The structure of the HOE can be modified gradually to be further divided into the structure having a passive grating and the structure having an active grating.

The glass optical element having a passive grating as shown in FIG. 8E can have an in-coupler 305a on the opposite surface of the glass surface on which the optical image is incident and an out-coupler 305b on the opposite surface of the glass surface from which the optical image is emitted. Here, the in-coupler 305a and the out-coupler 305b can be provided in the form of film having a passive grating.

Accordingly, the optical image incident on the glass surface at the light-incident side of the glass is totally reflected by the in-coupler 305a installed on the opposite surface, guided along the longitudinal direction of the glass, emitted through the opposite surface of the glass by the out-coupler 305b, and eventually perceived by the user.

The glass optical element having an active grating as shown in FIG. 8F can have an in-coupler 306a formed as an active grating inside the glass through which an optical image is incoming and an out-coupler 306b formed as an active grating inside the glass from which the optical image is emitted.

Accordingly, the optical image incident on the glass is totally reflected by the in-coupler 306a, guided in the longitudinal direction of the glass, emitted to the outside of the glass by the out-coupler 306b, and eventually perceived by the user.

The display unit 300-3 according to another embodiment of the present invention can use a pin mirror-type optical element.

The pinhole effect is so called because the hole through which an object is seen is like the one made with the point of a pin and refers to the effect of making an object look more clearly as light is passed through a small hole. This effect results from the nature of light due to refraction of light, and the light passing through the pinhole deepens the depth of field (DOE), which makes the image formed on the retina more vivid.

In what follows, an embodiment for using a pin mirror-type optical element will be described with reference to FIGS. 9A, 9B, 9C, 9D, 10A, 10B, 10C and 10D.

Figure 9A:
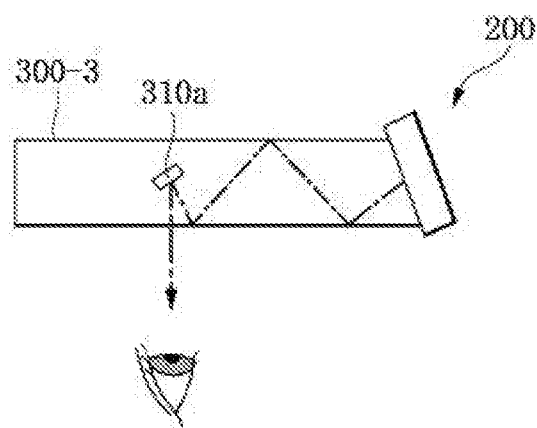

Referring to FIG. 9A, the pinhole mirror 310a can be provided on the path of incident light within the display unit 300-3 and reflect the incident light toward the user's eye. More specifically, the pinhole mirror 310a can be disposed between the front surface (outer surface) and the rear surface (inner surface) of the display unit 300-3, and a method for manufacturing the pinhole mirror will be described again later.

The pinhole mirror 310a can be formed to be smaller than the pupil of the eye and to provide a deep depth of field. Therefore, even if the focal length for viewing a real world through the display unit 300-3 is changed, the user can still clearly see the real world by overlapping an augmented reality image provided by the optical driving unit 200 with the image of the real world.

And the display unit 300-3 can provide a path which guides the incident light to the pinhole mirror 310a through internal total reflection.

Figure 9B:
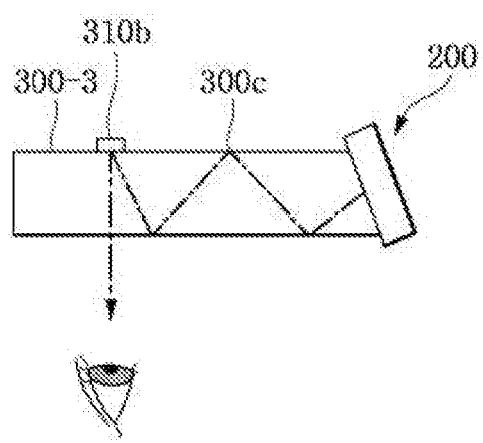

Referring to FIG. 9B, the pinhole mirror 310b can be provided on the surface 300c through which light is totally reflected in the display unit 300-3. Here, the pinhole mirror 310b can have the characteristic of a prism that changes the path of external light according to the user's eyes. For example, the pinhole mirror 310b can be fabricated as film-type and attached to the display unit 300-3, in which case the process for manufacturing the pinhole mirror is made easy.

The display unit 300-3 can guide the incident light incoming from the optical driving unit 200 through internal total reflection, the light incident by total reflection can be reflected by the pinhole mirror 310b installed on the surface on which external light is incident, and the reflected light can pass through the display unit 300-3 to reach the user's eyes.

Figure 9C:
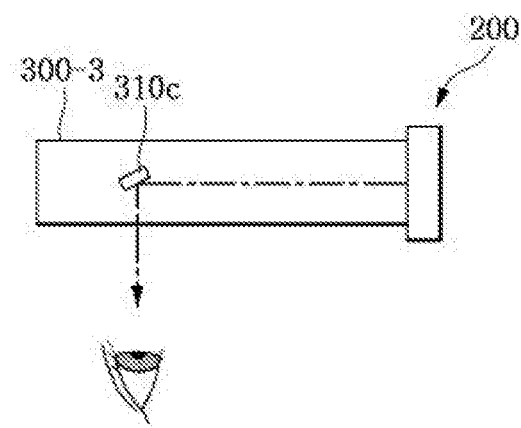

Referring to FIG. 9C, the incident light illuminated by the optical driving unit 200 can be reflected by the pinhole mirror 310c directly without internal total reflection within the display unit 300-3 and reach the user's eyes. This structure is convenient for the manufacturing process in that augmented reality can be provided irrespective of the shape of the surface through which external light passes within the display unit 300-3.

Figure 9D:
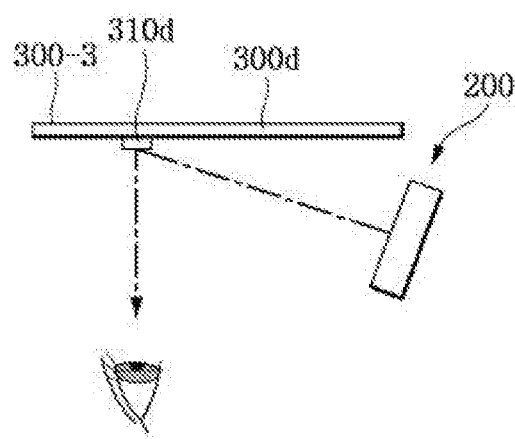

Referring to FIG. 9D, the light illuminated by the optical driving unit 200 can reach the user's eyes by being reflected within the display unit 300-3 by the pinhole mirror 310d installed on the surface 300d from which external light is emitted. The optical driving unit 200 is configured to illuminate light at the position separated from the surface of the display unit 300-3 in the direction of the rear surface and illuminate light toward the surface 300d from which external light is emitted within the display unit 300-3. The present embodiment can be applied easily when thickness of the display unit 300-3 is not sufficient to accommodate the light illuminated by the optical driving unit 200. Also, the present embodiment can be advantageous for manufacturing in that it can be applied irrespective of the surface shape of the display unit 300-3, and the pinhole mirror 310d can be manufactured in a film shape.

Meanwhile, the pinhole mirror 310 can be provided in plural numbers in an array pattern.

FIGS. 10A, 10B, 10C and 10D illustrate the shape of a pinhole mirror and structure of an array pattern according to one embodiment of the present invention.

Referring to the figure, the pinhole mirror 310 can be fabricated in a polygonal structure including a square or rectangular shape. Here, the length (diagonal length) of a longer axis of the pinhole mirror 310 can have a positive square root of the product of the focal length and wavelength of light illuminated in the display unit 300-3.

A plurality of pinhole mirrors 310 are disposed in parallel, being separated from each other, to form an array pattern. The array pattern can form a line pattern or lattice pattern.

Figure 10A:
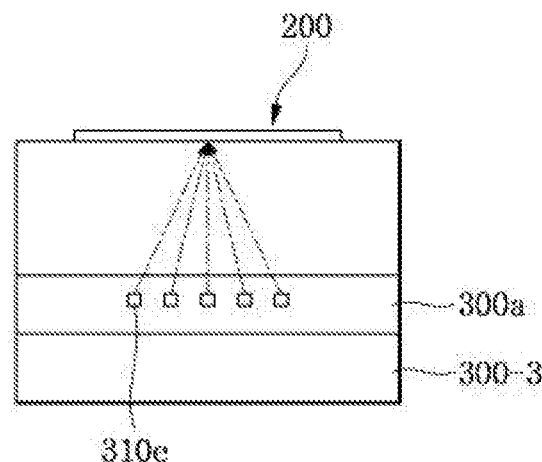
Figure 10B:
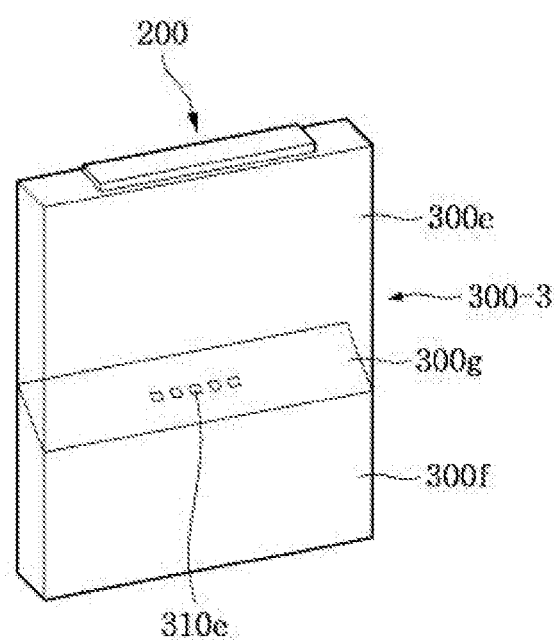
Figure 10C:
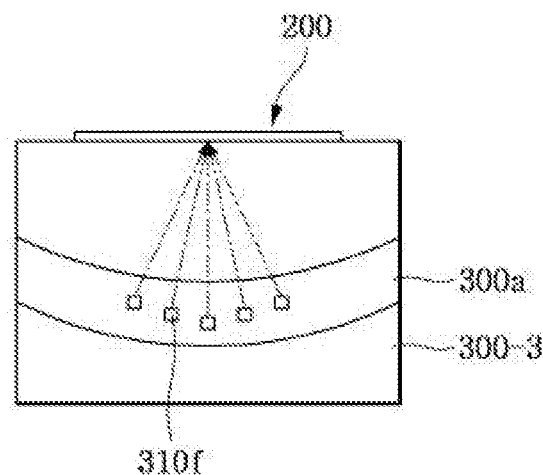
Figure 10D:
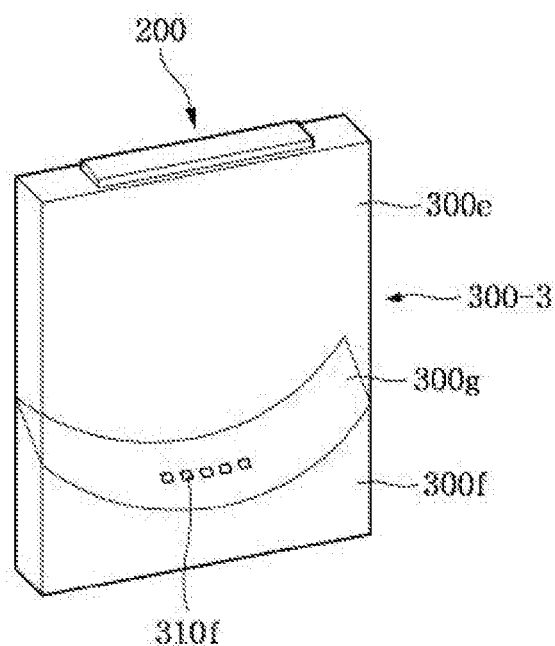

FIGS. 10A and 10B illustrate the Flat Pin Mirror scheme, and FIGS. 10C and 10D illustrate the freeform Pin Mirror scheme.

When the pinhole mirror 310 is installed inside the display unit 300-3, the first glass 300e and the second glass 300f are combined by an inclined surface 300g disposed being inclined toward the pupil of the eye, and a plurality of pinhole mirrors 310e are disposed on the inclined surface 300g by forming an array pattern.

Referring to FIGS. 10A and 10B, a plurality of pinhole mirrors 310e can be disposed side by side along one direction on the inclined surface 300g and continuously display the augmented reality provided by the optical driving unit 200 on the image of a real world seen through the display unit 300-3 even if the user moves the pupil of the eye.

And referring to FIGS. 10C and 10D, the plurality of pinhole mirrors 310f can form a radial array on the inclined surface 300g provided as a curved surface.

Since the plurality of pinhole mirrors 300f are disposed along the radial array, the pinhole mirror 310f at the edge in the figure is disposed at the highest position, and the pinhole mirror 310f in the middle thereof is disposed at the lowest position, the path of a beam emitted by the optical driving unit 200 can be matched to each pinhole mirror.

As described above, by disposing a plurality of pinhole arrays 310f along the radial array, the double image problem of augmented reality provided by the optical driving unit 200 due to the path difference of light can be resolved.

Similarly, lenses can be attached on the rear surface of the display unit 300-3 to compensate for the path difference of the light reflected from the plurality of pinhole mirrors 310e disposed side by side in a row.

The surface reflection-type optical element that can be applied to the display unit 300-4 according to another embodiment of the present invention can employ the freeform combiner method as shown in FIG. 11A, Flat HOE method as shown in FIG. 11B, and freeform HOE method as shown in FIG. 11C.

The surface reflection-type optical element based on the freeform combiner method as shown in FIG. 11A can use freeform combiner glass 300-4, for which a plurality of flat surfaces having different incidence angles for an optical image are combined to form one glass with a curved surface as a whole to perform the role of a combiner. The freeform combiner glass 300-4 emits an optical image to the user by making incidence angle of the optical image differ in the respective areas.

The surface reflection-type optical element based on Flat HOE method as shown in FIG. 11B can have a hologram optical element (HOE) 311 coated or patterned on the surface of flat glass, where an optical image emitted by the optical driving unit 200 passes through the HOE 311, reflects from the surface of the glass, again passes through the HOE 311, and is eventually emitted to the user.

The surface reflection-type optical element based on the freeform HOE method as shown in FIG. 11C can have a HOE 313 coated or patterned on the surface of freeform glass, where the operating principles can be the same as described with reference to FIG. 11B.

In addition, a display unit 300-5 employing micro LED as shown in FIG. 12 and a display unit 300-6 employing a contact lens as shown in FIG. 13 can also be used.

Referring to FIG. 12, the optical element of the display unit 300-5 can include a Liquid Crystal on Silicon (LCoS) element, Liquid Crystal Display (LCD) element, Organic Light Emitting Diode (OLED) display element, and Digital Micromirror Device (DMD); and the optical element can further include a next-generation display element such as Micro LED and Quantum Dot (QD) LED.

The image data generated by the optical driving unit 200 to correspond to the augmented reality image is transmitted to the display unit 300-5 along a conductive input line 316, and the display unit 300-5 can convert the image signal to light through a plurality of optical elements 314 (for example, microLED) and emits the converted light to the user's eye.

The plurality of optical elements 314 are disposed in a lattice structure (for example, 100×100) to form a display area 314a. The user can see the augmented reality through the display area 314a within the display unit 300-5. And the plurality of optical elements 314 can be disposed on a transparent substrate.

The image signal generated by the optical driving unit 200 is sent to an image split circuit 315 provided at one side of the display unit 300-5; the image split circuit 315 is divided into a plurality of branches, where the image signal is further sent to an optical element 314 disposed at each branch. At this time, the image split circuit 315 can be located outside the field of view of the user so as to minimize gaze interference.

Referring to FIG. 13, the display unit can comprise a contact lens 300-6. A contact lens 300-6 on which augmented reality can be displayed is also called a smart contact lens. The smart contact lens 300-6 can have a plurality of optical elements 317 in a lattice structure at the center of the smart contact lens.

The smart contact lens 300-6 can include a solar cell 318a, battery 318b, optical driving unit 200, antenna 318c, and sensor 318d in addition to the optical element 317. For example, the sensor 318d can check the blood sugar level in the tear (e.g., of a user/wearer), and the optical driving unit 200 can process the signal of the sensor 318d and display the blood sugar level (of the user/wearer) in the form of augmented reality through the optical element 317 so that the user can check the blood sugar level in real-time.

As described above, the display unit 300 according to one embodiment of the present invention can be implemented by using one of the prism-type optical element, waveguide-type optical element, light guide optical element (LOE), pin mirror-type optical element, or surface reflection-type optical element. In addition to the above, an optical element that can be applied to the display unit 300 according to one embodiment of the present invention can include a retina scan method.

Figure 14:
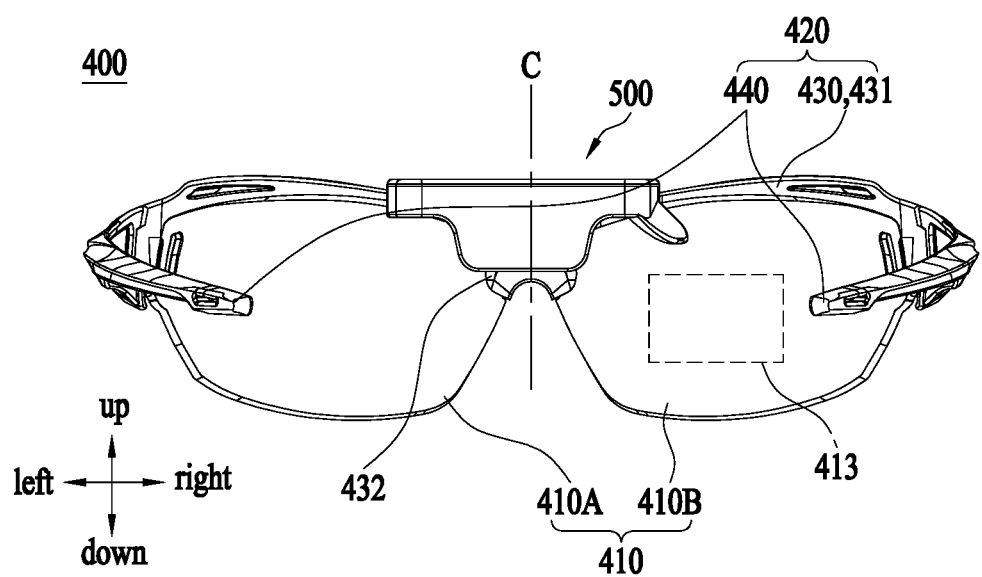
FIG. 14 is a rear view of an electronic device related to the present disclosure.
Figure 15A:
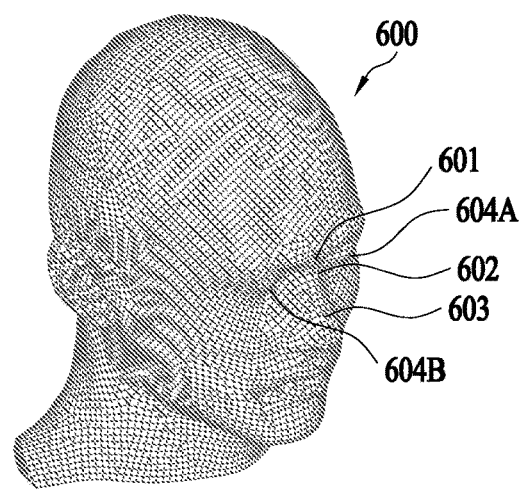
FIG. 15A is a front perspective view before the wearer wears an electronic device and FIG. 15B is a front perspective view after the wearer wears an electronic device related to the present disclosure.
Figure 15B:
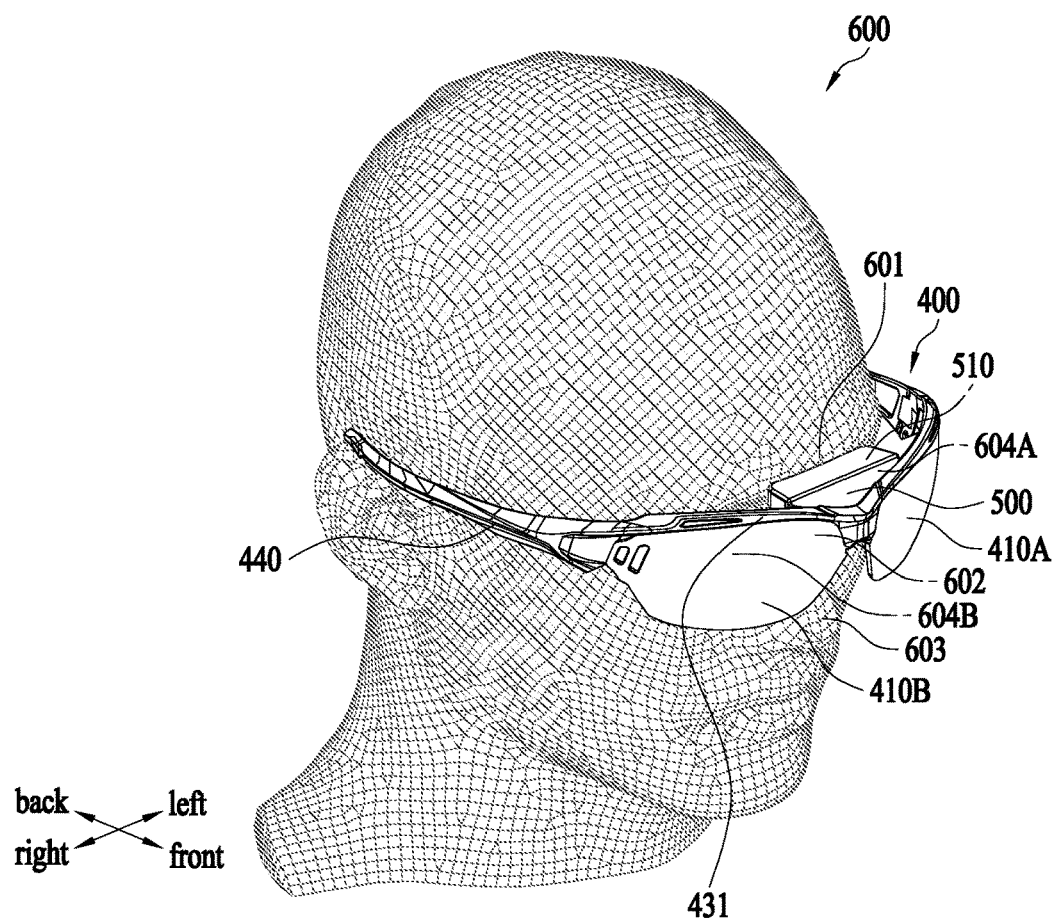

FIG. 14 is a rear view of an electronic device 400 related to the present disclosure, and FIGS. 15A and 15B are front perspective views before and after a wearer 600 puts on the electronic device 400 according to the present disclosure.

The electronic device 400 has a binocular lens 410 corresponding to both eyes 604 of the wearer 600. The binocular lens 410 refers to a plate-shaped member configured to be optically transparent so that the wearer 600 can see objects located outside the electronic device 400. The binocular lens 410A and 410B can be provided separately to correspond to a left eye 604A and a right eye 604B of the wearer 600, or can be provided as an integrally formed member without being separated for the two eyes.

A lens frame 420 can be connected to the binocular lens 410 for fixing the binocular lens 410 and be seated on the head of the wearer 600 such that the binocular lens 410 is positioned corresponding to the both eyes of the wearer 600. The lens frame 420 can include a front frame 430 and a side frame 440 in a broad sense. The front frame 430 can be disposed at a front side of the electronic device 400 to form a front appearance and can support the wearer's nose 603 so that the electronic device 400 can be held. The side frame 440 can be positioned on a side surface of the electronic device 400 and can be supported by the wearer's ear to allow the electronic device 400 to be held. The front frame 430 and the side frame 440 can be connected to each other.

The front frame 430 includes an upper frame 431 coupled to an upper boundary of the binocular lens 410, and a lower frame coupled to a lower boundary of the binocular lens 410. In some cases, the lower frame can be omitted.

The upper frame 431 or the lower frame can include a nose support 432. When the nose support 432 is formed in the upper frame 431, the upper frame 431 can extend downwards from the center in a transverse direction of the front frame 430 to form the nose support 432. The transverse direction means left direction or right direction with respect to the front view of the electronic device 400. Alternatively, the nose support 432 can be provided separately from the upper frame 431 or the lower frame and can be coupled in the middle of the binocular lens 410.

The electronic device 400 can show an image light corresponding to a content to the wearer 600 through the binocular lens 410. At this point, the content can be augmented reality information corresponding to objects in an outside view. The light can be reflected by the binocular lens 410 and be then incident on the eyes of the wearer 600 to form an image. In the binocular lens 410, a first area in which the light is reflected can be defined as a reflection region 413. The reflection region 413 can be part of the area of the binocular lens 410.

An optical driving assembly 510 can include an image source panel 511 and an emitting lens group 512. The emitting lens group 512 can adjust an emitting angle and a focal length of the light generated from the image source panel 511. The emitting lens group 512 can include a plurality of lenses 5121, and the plurality of lenses 5121 can be arranged in a stack along an optical axis.

The optical driving assembly 510 can be provided in both directions such that an image is output to both sides of the binocular lens 410. Alternatively, the optical driving assembly 510 can be provided in one direction such that an image is output to any of the both sides of the binocular lens 410. In the drawing, it is described in the assumption that the optical driving assembly 510 functions only for a right eye area. However, unlike a related art in which the optical driving assembly is provided on a lateral side, the optical driving assembly of the present disclosure can be positioned at around the center even when the optical driving assembly is provided to allow an image to be output on the both sides, thereby achieving space layout efficiency and simplifying a complicated wiring structure.

In the electronic device 400 of the present disclosure, the optical driving assembly 510 is disposed at the center in the transverse direction of the electronic device 400. Unlike an existing form in which the optical driving assembly 510 is disposed on one side of the electronic device 400, the optical driving assembly 510 of the present disclosure can be disposed at the center in the transverse direction of the electronic device 400, thereby reducing a possibility to obstruct a field of view of the wearer 600 and preventing the center of weight of the electronic device 400 from being biased toward one side. In addition, when the optical driving assembly 510 is disposed at a lateral side of the electronic device 400, the optical driving assembly 510 can be more likely to be exposed to the outside, thereby increasing a possibility of breakage or damage of the optical driving assembly 510. On the other hand, when the optical driving assembly 510 is disposed at the center, the optical driving assembly 510 can be less likely to be hit while in use and can be less likely to touch a floor even while not in use, as compared with the case where the optical driving assembly 510 is disposed at the lateral side.

Furthermore, when the optical driving assembly 510 is disposed at the rear of the front frame 430, rather than the front thereof, the optical driving assembly 510 can be even more likely to be protected.

The optical driving assembly 510 can be disposed at the front frame 430 through an electronic component case 500. In other words, the optical driving assembly 510 can be mounted in an electronic component area 5004 and the electronic component case 500 forming the external appearance of the electronic component area 5004, and the electronic component case 500 can be provided in the front frame 430. Accordingly, the arrangement characteristic of the optical driving assembly 510 on the electronic device 400 can also be applied to the arrangement characteristic of the electronic component case 500, and vice versa. Most of the electronic components for light emission of the present disclosure, including the optical driving assembly 510, can be mounted in the electronic component area 5004 of the electronic component case 500. Details thereof will be described later.

The electronic component case 500 can be arranged to correspond especially to an area of a between superciliary arches 601 of the wearer 600, that is, an area between eyebrows. The area of the between superciliary arches 601 can be located relatively rearward than an area of the nose 603 of the wearer 600. Accordingly, a relatively long vertical rearward distance from the front frame 430 of the electronic device 400 to a face of the wearer 600 can be secured. Therefore, when the electronic component case 500 is disposed to correspond to the area of the between superciliary arches 601, it is advantageous to secure space.

More specifically, a lower end of the electronic component case 500 can correspond to an area of a nasal root 602 of the wearer 600. This is because the area of the nasal root 602 is located relatively rearward than the area of the nose 603 of the wearer 600.

The electronic component case 500 can be integrally fixed to the lens frame 420. When the electronic component case 500 is fixed to the lens frame 420, an optical path can be accurately fixed, thereby providing a clear image to the wearer 600 and improving durability.

On the other hand, the electronic component case 500 can be attachable to or detachable from the lens frame 420. When the electronic component case 500 is attachable to and detachable from the lens frame 420, the fixed position of the electronic component case 500 can be changed according to a body structure of the wearer 600. When the electronic component case 500 is not in use, the electronic device 400 can function as glasses or a goggle without combining the electronic component case 500. More specifically, the electronic component case 500 can be hooked to the lens frame 420. In particular, the electronic component case 500 can have a structure in which the electronic component case 500 is slidably guided on the lens frame 420 and is then hooked thereto.

The electronic component case 500 can be coupled to the upper frame 431 of the front frame 430 to correspond to an area of the between superciliary arches 601 of the wearer 600.

Figure 16A:
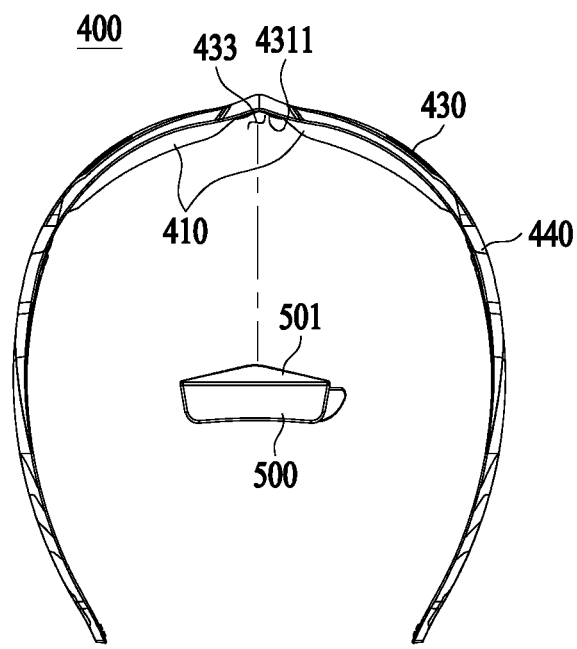
FIG. 16A is a top view of an electronic device related to the present disclosure before coupling to an electronic case component and FIG. 16B is a top view of an electronic device related to the present disclosure after coupling to an electronic component case.
Figure 16B:
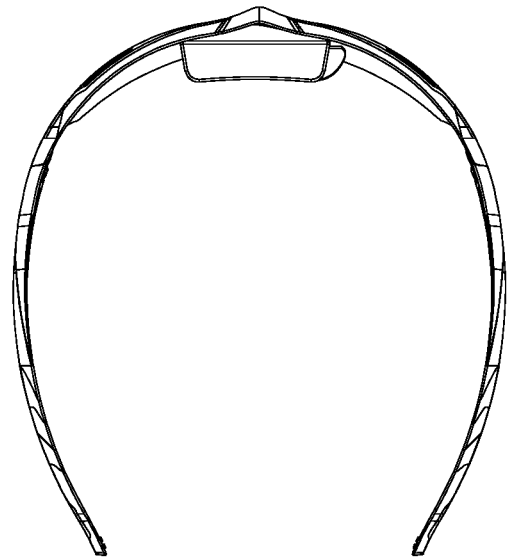
Figure 17:
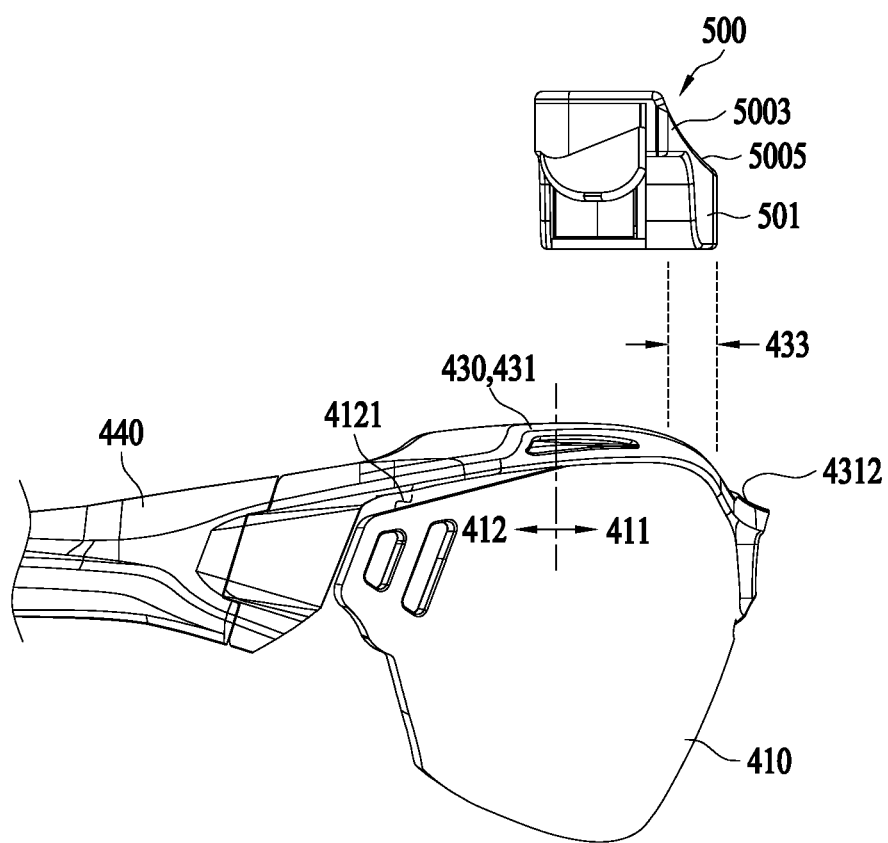
FIG. 17 is a side view of an electronic device related to the present disclosure.
Figure 18:
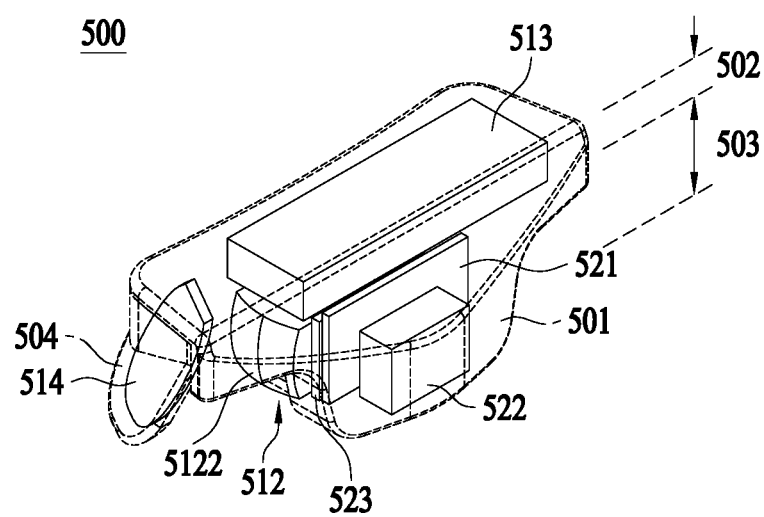
FIG. 18 is a front perspective view of an electronic component case.

FIGS. 16A and 16B are top views of the electronic device 400 related to the present disclosure before and after coupling of the electronic device 400, FIG. 17 is a side view of the electronic device 400 related to the present disclosure, and FIG. 18 is a front perspective view of the electronic case 500. FIG. 14 and FIG. 15 are referred to as well.

The electronic component case 500 can be provided at a front side or a rear side of the upper frame 431. When the electronic component case 500 is provided at the rear side of the upper frame 431, the electronic component case 500 can include a support member for supporting the wearer 600 at the rear side. The support member can support the area of the between superciliary arches 601 when the electronic device 400 is worn. This can prevent the load of the electronic component case 500 from being concentrated on a nasal bridge of the wearer 600. The support member can have a shape that protrudes rearward to support the area of the between superciliary arches 601. The support member is preferably formed of an elastic material so that the support member can be stably seated to fit the shape of a counterpart. A support surface of the support member can form an inclined surface facing backwards and downwards so that the area of the between superciliary arches 601 of the wearer 600 can support the electronic device 400.

When the electronic component case 500 is coupled to a rear side 4311 of the upper frame 431, the electronic component case 500 can be provided in a shape corresponding to a shape of the rear side 4311 of the upper frame 431. For example, when the rear side 4311 of the upper frame 431 includes the concave portion 433 recessed forward, the electronic component case 500 can have a forward protrusion 501 that fills the concave portion 433. The front protrusion 501 can be formed such that a lower transverse central area of the electronic component case 500 protrudes a predetermined distance further than a periphery area of the electronic component case 500.

When a front side 5003 of the electronic component case 500 and the rear side 4311 of the upper frame 431 have shapes corresponding to each other, the electronic component case 500 and the upper frame 431 can be stably fixed, and the space for the electronic component area 5004 of the electronic component case 500 can be secured up to the concave portion 433, thereby increasing the degree of freedom of arrangement of electronic components.

The upper surface of the electronic component case 500 can also be provided to fit an upper boundary 4312 of the center area of the upper frame 431. For example, when the upper boundary 4312 of the center area of the upper frame 431 has a shape inclined downward and forward, an upper surface 5005 of the protruding portion of the electronic component case 500 can form the same inclined surface. This is to maximize the utility of the space at the rear of the electronic component case 500 while improving the unity of the electronic component case 500 and the upper frame 431, and also to keep the ergonomic design, such as air resistance, of the upper frame 431.

For a similar purpose, the electronic component case 500 can form the electronic component area 5004, in which a transverse width of an upper portion 502 is greater than a transverse width of a lower portion 503, and an external appearance thereof. Since the upper portion 502 of the electronic component case 500 corresponds to the area of the between superciliary arches 601 and the lower portion 503 corresponds to the area of the nasal root 602, the upper portion 502 can be preferably provided with a greater transverse width of the upper portion 502 so as not to obstruct the area of the binocular lens 410 as much as possible.

In particular, a battery 513 for supplying power to the optical driving assembly 510 can be provided in the upper portion 502 of the electronic component case 500. Since the upper portion 502 of the electronic component case 500 is a larger space than that of the lower portion 503 for the above-described reason, it is effective that the battery 513 having a relatively large volume is disposed in the upper portion 502. In particular, when the upward moving characteristic of heat is considered, the battery 513 being disposed in the upper portion 502 can be advantageous to a heat dissipation structure of the optical driving assembly 510.

The battery 513 can be disposed in the upper portion 502 of the electronic component case 500 and biased forward at the same time so as to be spaced apart forward from the area between the superciliary arches 601 of the wearer 600. This is to minimize discomfort of use caused by heat emitted from the battery 513 and transferred to the area of the between superciliary arches 601 of the wearer 600.

Figure 19:
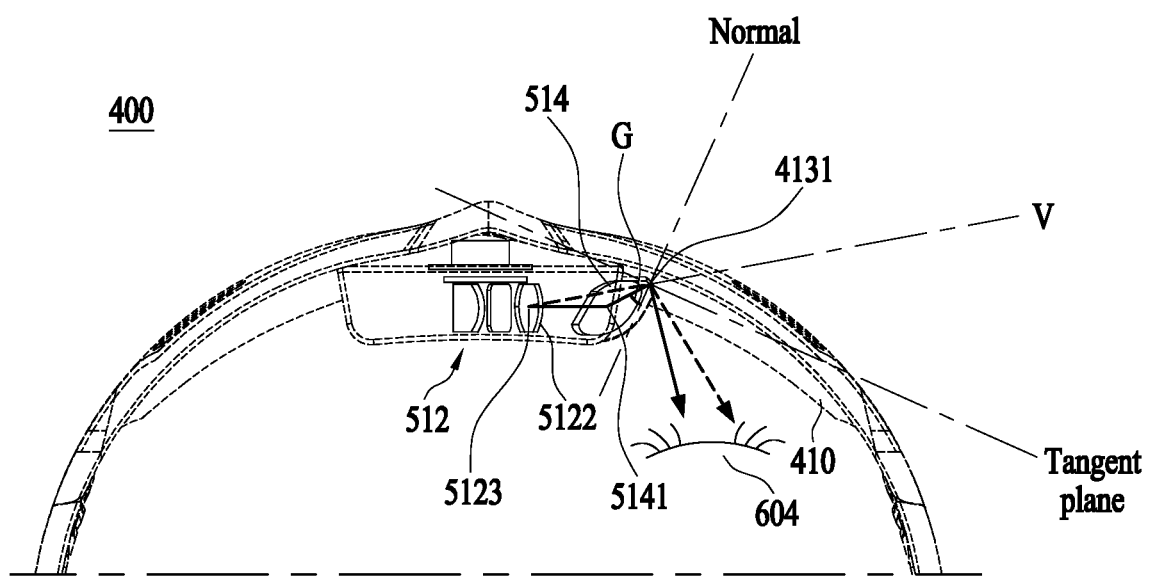
FIG. 19 schematically shows an optical path in an electronic device related to the present disclosure.

FIG. 19 is a view schematically illustrating an optical path in the electronic device 400 related to the present disclosure. FIGS. 14 to 18 are referred to as well.

Hereinafter, a process in which a light emitted through the optical driving assembly 510 reaches the wearer 600 will be described. Briefly, the emitting lens group 512 can be provided in a transverse central area of the electronic device 400, and the emitting lens group 512, the reflective mirror 514, the reflection region 413, and one of the eyes of the wearer are sequentially positioned with respect to a transverse direction of the electronic device 400.

In detail, the emitting lens group 512 can transmit a light generated and emitted from the image source panel 511, so that the generated light exits to the outside of the electronic component case 500. The emitted light can be reflected by an inner surface of the binocular lens 410 to arrive at an eye 604 of the wearer 600. The binocular lens 410 can be coated with a reflective material on the reflection region 413 to reflect an image light. Since the reflective material can degrade light transmittance of a field of view, the reflective material can be provided only in the reflection region 413 which is the minimum area where the light needs to be reflected. Some of the light can be reflected and the rest of the light can be transmitted.

The emitted light must be incident onto the binocular lens 410 at an appropriate angle to arrive at the eye 604 of the wearer 600. If the angle of incidence of light arriving at the binocular lens 410 is too large, distortion of an image can occur or the light may not arrive at the eye 604 of the wearer 600. If the angle of incidence of light is too small, the position of a member emitting (reflecting) the light can obstruct the field of view of the wearer 600. Therefore, proper placement is important. Empirically, the angle of incidence G on the binocular lens 410 can be preferably 45 degrees or less within a range where obstruction to the field of view of the wearer 600 is minimized.

In order to achieve the above requirement, the optical driving assembly 510 of the electronic device 400 can include a reflective mirror 514 to reflect a light emitted from the emitting lens group 512 to the binocular lens 410, especially the reflective region 413 of the binocular lens 410. The reflective mirror 514 can be provided in the electronic component case 500. Since the reflective mirror 514 is provided, as shown in a solid-line path of FIG. 19, the optical driving assembly 510 can be disposed far away from the reflection region 413 of the binocular lens 410 to secure the field of view of the wearer 600 while having a small enough angle of incidence of light. This is in contrast to a dotted-line path in FIG. 19 where the reflective mirror 514 is not provided.

In order to minimize obstruction to the field of view of the wearer 600, an exit surface 5122 of the emitting lens group 512 and a reflective surface of the reflective mirror 514 can be exposed to the outside of the electronic component case 500. The reflective mirror 514 can be disposed at one point on an optical path of light emitted from the exit surface 5122. In addition, the electronic component case 500 can be left open without enclosing the optical path reaching from the exit surface 5122 to the reflective mirror 514. As a result, the space occupied by the electronic component case 500 can be minimized, and obstruction to the field of view of the wearer 600 can be minimized. The reflective mirror 514 can be disposed on an inclined mounting surface 504 that protrudes from the electronic component case 500. The inclined mounting surface 504 can protrude downward from a left end or a right end of the upper portion 502 of the electronic component case 500 to form an inclined surface.

With respect to a vertical plane V passing through a center 5123 of the exit surface and a center 4131 of the reflection region of the binocular lens 410, due to the presence of the reflective mirror 514, a direction vector of light emitted from the emitting lens group 512 can have a rearward component and a direction vector of light reflected by the reflective mirror 514 can have a forward component. The direction vector of light reflected by the reflection region 413 of the binocular lens 410 again has a rearward component to arrive at the eyes 604 of the wearer 600.

As viewed from the upper surface of the electronic device 400, a center 5141 of the reflective mirror 514 can be positioned at the center in a stacking direction of the plurality of lenses 5121 of the emitting lens group 512. This means that the emitting lens group 512 is not provided in the shape of a freeform, as viewed from the upper surface of the electronic device. In particular, the stacking direction of the plurality of lenses 5121 of the emitting lens group 512 can be parallel to the transverse direction of the electronic device 400 as viewed from the upper surface of the electronic device. This is for balance in the shape of the electronic component case 500.

The geometrical arrangement and optical properties of the emitting lens group portion 512, the reflective mirror 514, and the reflection region 413 of the binocular lens 410 can be factors for forming an appropriate image for the wearer 600. Therefore, it is desirable that the specified optical conditions remain unchanged.

Nevertheless, the binocular lens 410 of the electronic device 400 can be deformable according to a physical condition of the wearer 600. In particular, if the binocular lens 410 applies to a goggle-type electronic device 400 in which the binocular lens 410 transversely fully covers both the left and right eyes of the wearer, the binocular lens 410 can be opened as the side frame 440 of the electronic device 400 is opened. In this case, a curvature of the binocular lens 410 can change and, in turn, the specified optical path can change. Therefore, in order to solve this problem, the deformation of the binocular lens 410 can be minimized despite the deformation of the lens frame 420. In one embodiment, out of a transverse inner portion 411 and a transverse outer portion 412 of the binocular lens 410, only the inner portion 411 can be fixed to the upper frame 431 and the outer portion 412 may not be fixed to the upper frame 431. It means that the outer portion 412 of the upper frame 431 is spaced from the upper boundary of the binocular lens 410 and is fixed to the side frame 440. The inner portion 411 can correspond to a region near a transverse central axis C of the upper frame 431, and the outer portion 412 can correspond to a region transversely outward of the inner portion 411 in the upper frame 431. When only the inner portion 411 of the binocular lens 410 is fixed to the upper frame 431, a degree of deformation of the binocular lens 410 according to deformation of the front frame 430 or the side frame 440 can be minimized. In particular, if the outer portion 412 of the binocular lens 410 forms a space 4121 with the upper frame 431, interference with the binocular lens 410 can be avoided when the upper frame 431 is deformed.

Figure 20:
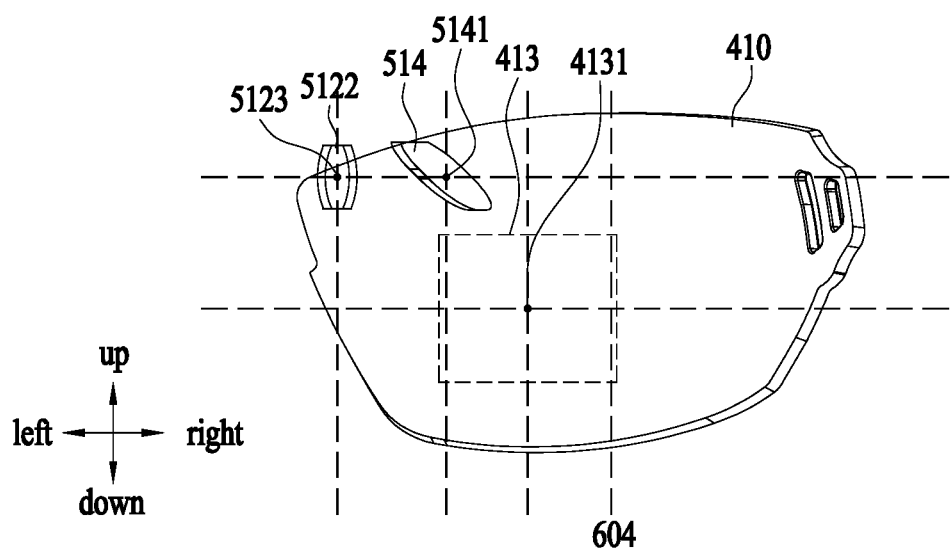
FIGS. 20 to 22 are some embodiments of a conceptual view of an optical path viewed from a rear side of an electronic device related to the present disclosure.
Figure 21:
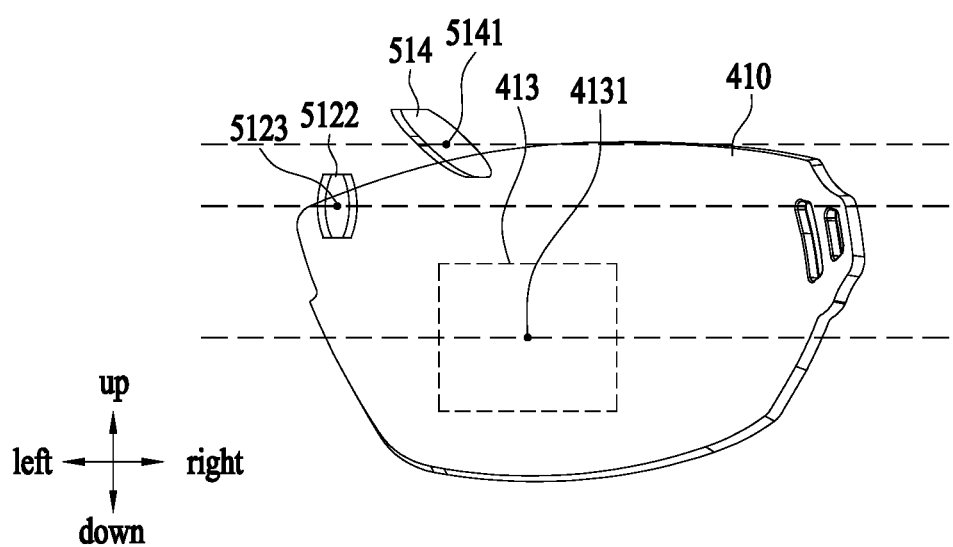
Figure 22:
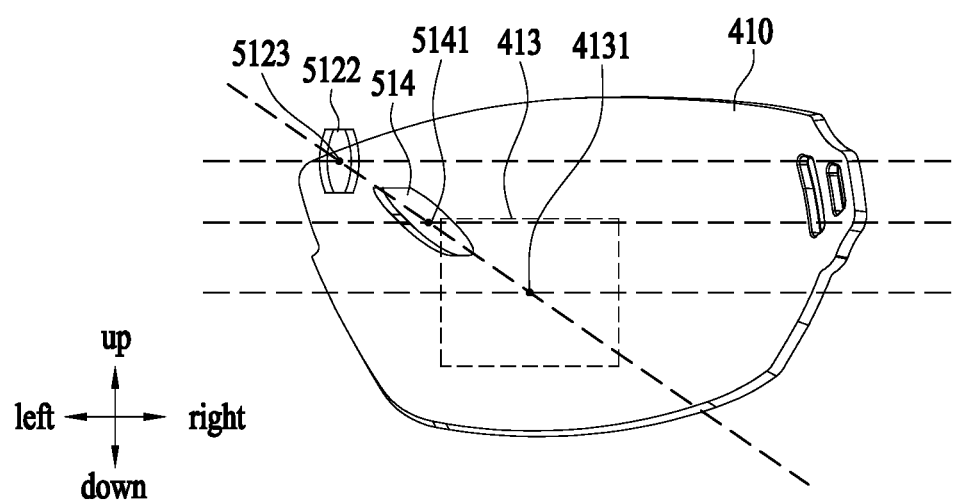

FIGS. 20 to 22 are some embodiments of a conceptual view of an optical path viewed from the rear side of the electronic device 400 related to the present disclosure.

When the emitting lens group 512 is provided in the area of the nasal root 602, a height of the center 4131 of the reflection region 413 of the binocular lens 410 can be lower than a height of the center 5123 of the exit surface of the emitting lens group 512. In this arrangement, a height of the reflective mirror 514 can be considered. A height mentioned below is based on a front side or a rear side of the electronic device 400, and based on the center of each component.

FIG. 20 illustrates that a reflection center of the reflective mirror 514 is positioned at the same height as a center of the exit surface 5122 of the emitting lens group 512. If the height of the exit surface 5122 and the height of the reflective mirror 514 are identical to each other, the space occupied by the electronic component case 500 can be small, which is advantageous in terms of weight and volume. In addition, since the reflective mirror 514 and the stacking direction of each lens of the emitting lens group 512 are positioned on the same horizontal line, an optical path between the emitting lens group 512 and the reflective mirror 514 can be positioned within the electronic component case 500. This arrangement can be suitable to position the exit surface 5122 within the electronic component case 500, rather than being exposed to an outside of the electronic component case 500. In addition, when it comes to a height component, an optical path reaching from the emitting lens group 512 to the reflective mirror 514 can be formed straight, and thus, if the reflective mirror 514 is positioned on a line extending from the stacking direction of the plurality of lenses of the emitting lens group 512 as viewed from the upper surface of the electronic device, the emitting lens group 512 can be implemented in a general lens design rather than a freeform shape. This means that lens design and production costs can be saved.

Alternatively, as shown in FIG. 21, the height of the reflective mirror 514 can be higher than the height of the exit surface 5122 of the emitting lens group 512. As the reflective mirror 514 is placed high, the reflective mirror 514 can be positioned at an outer side of the binocular lens 410 and can less obstruct the field of view of the wearer 600.

Alternatively, as shown in FIG. 22, the height of the reflective mirror 514 can be lower than the height of the exit surface 5122 of the emitting lens group 512. In particular, the reflective mirror 514 can be positioned on or near a straight line connecting the center 5123 of the exit surface 5122 and the center 4131 of the reflection region 413 of the binocular lens 410. This means that light can arrive at the reflection region 413 along a relatively short optical path and that the exit surface 5122 and the reflective mirror 514 can be disposed at a short distance to each other. Therefore, it is possible to reduce obstruction to the field of the view by the reflective mirror 514 and the space occupied by the electronic component case 500. In addition, it is possible to minimize a possibility of interference between the nasal bridge of the wearer 600 and the electronic component case 500.

Figure 23:
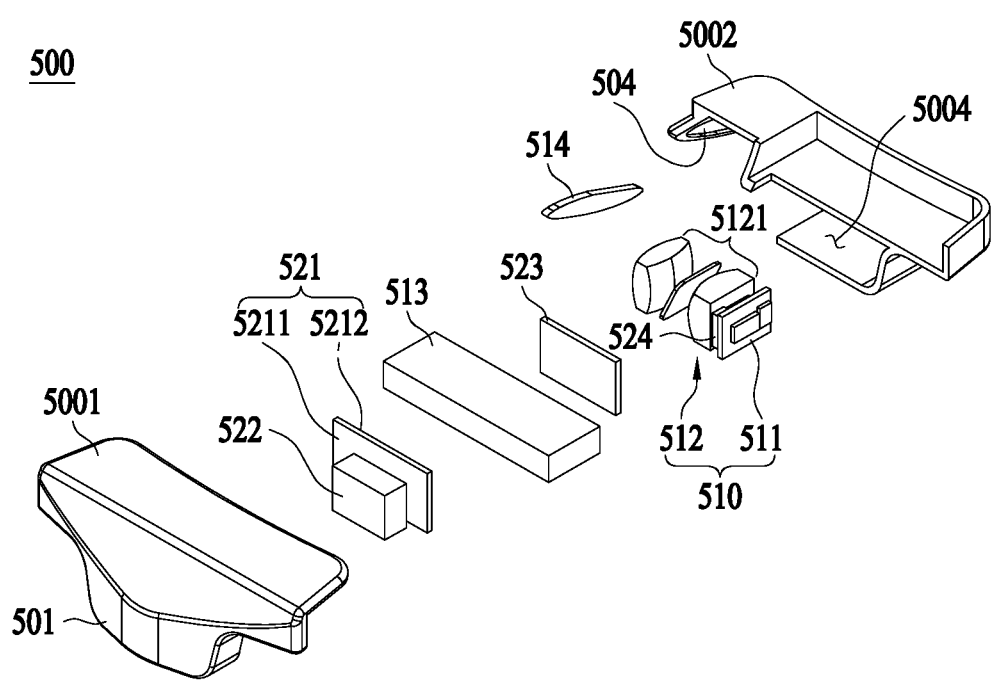
FIG. 23 is an exploded perspective view of an electronic component case related to the present disclosure.

FIG. 23 is an exploded perspective view of the electronic component case 500 according to the present disclosure.

As described above, the battery 513 can be provided at the upper portion 502 of the electronic component case 500, and the emitting lens group 512 and the image source panel 511 can be provided at the lower portion 503. The plurality of lenses 5121 of the emitting lens group 512 can be stacked in the transverse direction of the electronic device 400. Of course, the plurality of lenses 5121 can be arranged obliquely as needed.

The image source panel 511 can be disposed on the opposite side to the reflective mirror 514 with respect to the emitting lens group 512, so that generated light properly arrives at the reflective mirror 514 through the emitting lens group 512.

A printed circuit board (PCB) 521 can have the image source panel 511 and other electronic components 522, such as a driving chipset for emitting light, mounted thereon. In particular, one side and the other side of the printed circuit board 521 can be disposed to face forward and rearward. This is because a width of the electronic component case 500 in a vertical direction is relatively limited due to the shape of the nose or the like.

The printed circuit board 521 and the emitting lens group 512 can be disposed in the front and rear sides of the electronic component case 500, respectively. This takes into account the shape of the electronic component area in the electronic component case 500. Since the emitting lens group 512 and the image source panel 511 are provided in the transverse direction, the printed circuit board 521 and the image source panel 511 can have a relationship orthogonal to each other. Thus, the two components can be electrically connected by a flexible printed circuit board (FPCB) 524.

A middle frame 523 can divide a lower portion 503 of the electronic component area into two spaces and fix electronic components. In particular, the middle frame 523 can be provided between the printed circuit board 521 and the emitting lens group 512. The middle frame 523 can fix the printed circuit board at one surface and the emitting lens group 512 at the other surface.

The other chipset electronic components 522 can be provided on one surface 5211 of the printed circuit board 521. The other electronic components 522 can be fixed to the printed circuit board 521 through a surface mount technology (SMT). In this case, the other electronic components 522 can be disposed in a protruding internal space formed by the forward protrusion 501 of the electronic component case 500 described above.

As described above, since the image source panel 511 is connected to the printed circuit board 521 through the flexible printed circuit board (FPCB) 524, the image source panel 511 can bypass the middle frame 523.

The electronic component case 500 can have a guide shape for seating or fixing components of the electronic component area. That is, since the electronic component case 500 has a small volume not enough to have a complex fixing structure for fixing the components, the electronic component case 500 itself can serve as a seating guide for the components so as to help fix the components.

The electronic component case 500 can include a seating frame 5001 having at least one open area and a cover frame 5002 for selectively opening and closing the at least one open area of the seating frame 5001. When the electronic component case 500 is integrally formed with the upper frame 431, the seating frame 5001 can be integrally fixed to the upper frame 431.

The advantageous effects of the electronic device according to the present disclosure will be described below.

According to at least one of the embodiments of the present disclosure, it is possible to achieve transverse balance of the electronic device stably.

In addition, according to at least one of the embodiments of the present disclosure, as the optical driving assembly is located at the center, it is possible to output an image corresponding to a content to both sides of the binocular lens.

In addition, according to at least one of the embodiments of the present disclosure, it is possible to minimize obstruction to a field of view of a user by the optical driving assembly.

In addition, according to at least one of the embodiments of the present disclosure, it is possible to prevent concentration of the load of the electronic device.

In addition, according to at least one of the embodiments of the present disclosure, it is possible to maximize heat radiation efficiency.

In addition, according to at least one of the embodiments of the present disclosure, it is possible to minimize the space occupied by the electronic component case in which the optical driving assembly is mounted.

In addition, according to at least one of the embodiments of the present disclosure, it is possible to maximize efficiency of use of the electronic component area of the electronic component case.

In addition, according to at least one of the embodiments of the present disclosure, it is possible to maintain an ergonomic shape despite the addition of the electronic component case.

In addition, according to at least one of the embodiments of the present disclosure, it is possible to obtain a clear image through efficient design of an optical path.

In addition, according to at least one of the embodiments of the present disclosure, it is possible to stably fix the optical driving assembly to the lens frame.

In addition, according to at least one of the embodiments of the present disclosure, it is possible not to cause a big change in the optical path even when the electronic device is worn by a user.

In addition, according to at least one of the embodiments of the present disclosure, it is possible to prevent direct transfer of heat produced by the battery to the user.

Further scope of the applicability of the present disclosure will become apparent from the following detailed description. However, since it will be apparent to those skilled in the art that various modifications and variations can be made therein without departing from the spirit and scope of the invention, it is to be understood that the following detailed description of the present disclosure and a specific embodiment such as a preferred embodiment of the present disclosure are merely exemplary and explanatory.

It is apparent to those skilled in the art that the present disclosure can be embodied in other specific forms without departing from the spirit and essential features of the present disclosure.

In addition, the above detailed description should not be construed as limiting in all aspects and should be considered as illustrative. The scope of the present disclosure should be determined by reasonable interpretation of the appended claims, and all changes within the equivalent scope of the present disclosure are included in the scope of the present disclosure.

What is claimed is:

1. An electronic device, comprising:
   a binocular lens provided to correspond to eyes of a wearer;
   a lens frame fixed to the binocular lens and configured to be seated on a head of the wearer;
   an electronic component case fixed to the lens frame;
   an optical driving assembly mounted in the electronic component case and configured to emit image light to the binocular lens; and
   a battery configured to supply power to the optical driving assembly,
   wherein a position of the electronic component case corresponds to an area between superciliary arches of the wearer,
   wherein an upper transverse width of an upper portion of the electronic component case is greater than a lower transverse width of a lower portion of the electronic component case,
   wherein the optical driving assembly comprises:
      an image source panel configured to emit light;
      an emitting lens group provided on an optical path of the light emitted from the image source panel to transmit the light emitted from the image source panel; and
      a reflective mirror positioned adjacent to the emitting lens group and configured to reflect light emitted from the emitting lens group to the binocular lens directly,
   wherein a height of the reflective mirror is same as a height of an exit surface of the emitting lens group, and the reflective mirror is positioned on a line extending from a stacking direction line of a plurality of lenses of the emitting lens group,
   wherein the stacking direction line of the plurality of lenses of the emitting lens group corresponds to a transverse direction of the electronic device,
   wherein an angle of incidence on the binocular lens from the reflective mirror is 45 degrees or less, as viewed from an upper surface of the electronic device, and
   wherein the reflective mirror is provided between a reflection region of the binocular lens and the emitting lens group, in the transverse direction of the electronic device.

2. The electronic device of claim 1, wherein:
   the lens frame comprises an upper frame coupled to an upper boundary of the binocular lens, and
   the electronic component case is fixed to the upper frame.

3. The electronic device of claim 2, wherein the electronic component case is provided at a rear side of the upper frame.

4. The electronic device of claim 3, further comprising a support member provided at a rear side of the electronic component case to support the area between the superciliary arches of the wearer.

5. The electronic device of claim 4, wherein the support member is provided at the rear side of the electronic component case and comprises an elastic material.

6. The electronic device of claim 3, wherein the rear side of the upper frame comprises a concave portion that is recessed forwardly, and
   the electronic component case includes a forward protrusion that fills the concave portion of the upper frame.

7. The electronic device of claim 2, wherein:
   the lens frame further comprises a side frame configured to be seated at both sides of the head of the wearer, the upper frame comprises:
an inner portion forming a center area of the lens frame; and
an outer portion provided transversely outward of the inner portion and connected to the side frame,
the inner portion is fixed to the upper boundary of the binocular lens, and
the outer portion is spaced from the upper boundary of the binocular lens and is fixed to the side frame.

8. The electronic device of claim 1, wherein the upper portion of the electronic component case corresponds to the area between the superciliary arches of the wearer and the lower portion of the electronic component case corresponds to an area of a nasal root of the wearer.

9. The electronic device of claim 1, wherein the image source panel and the emitting lens group are provided in the lower portion of the electronic component case.

10. An electronic device, comprising:
a binocular lens provided to correspond to eyes of a wearer;
a lens frame connected to the binocular lens and configured to be seated on a head of the wearer;
an electronic component case disposed in a central area of the binocular lens and connected to the lens frame; and
an optical driving assembly mounted in the electronic component case and configured to emit image light to the binocular lens,
wherein the optical driving assembly comprises:
an image source panel configured to emit light;
an emitting lens group provided on an optical path of the light emitted from the image source panel to transmit the light emitted from the image source panel; and
a reflective mirror positioned adjacent to the emitting lens group and configured to reflect light emitted from the emitting lens group to the binocular lens directly,
wherein the reflected light in the reflective mirror is reflected in a reflection region of the binocular lens and be then incident on eyes of the wearer to form an image,
wherein the lens frame comprises an upper frame coupled to an upper boundary of the binocular lens,
wherein the electronic component case is fixed to the upper frame,
wherein the electronic component case is provided at a rear side of the upper frame,
wherein the rear side of the upper frame comprises a concave portion that is recessed forwardly,
wherein the electronic component case includes a forward protrusion that fills the concave portion of the upper frame,
wherein an angle of incidence on the binocular lens from the reflective mirror is 45 degrees or less, as viewed from an upper surface of the electronic device, and
wherein the reflective mirror is provided between the reflection region of the binocular lens and a reflection region of the emitting lens group, in a transverse direction of the electronic device.

11. The electronic device of claim 10, wherein, with respect to a vertical plane passing through a center of an exit surface of the emitting lens group and a center of the reflection region, a direction vector of the light emitted from the emitting lens group has a rearward component.

12. The electronic device of claim 10, wherein the binocular lens comprises an optically transparent material, and the reflection region is coated so that at least a portion of light is reflected.

13. The electronic device of claim 10, wherein:
the lens frame further comprises a side frame seated at both sides of the head of the wearer,
the upper frame of the lens frame comprises:
an inner portion forming a center area of the lens frame; and
an outer portion provided transversely outward of the inner portion and connected to the side frame,
the inner portion is fixed only to the upper boundary of the binocular lens, and
the outer portion is spaced from the upper boundary of the binocular lens and is fixed to the side frame of the lens frame.

* * * * *